(12) United States Patent
Fukasawa et al.

(10) Patent No.: US 10,893,170 B2
(45) Date of Patent: Jan. 12, 2021

(54) PROFILE ADJUSTMENT METHOD, AND PROFILE ADJUSTMENT DEVICE

(71) Applicant: SEIKO EPSON CORPORATION, Tokyo (JP)

(72) Inventors: Kenji Fukasawa, Nagano (JP); Mitsuhiro Yamashita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/996,582

(22) Filed: Jun. 4, 2018

(65) Prior Publication Data

US 2018/0352114 A1 Dec. 6, 2018

(30) Foreign Application Priority Data

Jun. 6, 2017 (JP) .................................. 2017-111410

(51) Int. Cl.
*H04N 1/60* (2006.01)

(52) U.S. Cl.
CPC ........... *H04N 1/6008* (2013.01); *H04N 1/603* (2013.01); *H04N 1/6011* (2013.01); *H04N 1/6025* (2013.01); *H04N 1/6036* (2013.01)

(58) Field of Classification Search
None
See application file for complete search history.

(56) References Cited

U.S. PATENT DOCUMENTS

| 2003/0053094 A1 | 3/2003 | Ohga et al. |
| 2003/0053097 A1 | 3/2003 | Ohga et al. |
| 2006/0152612 A1 | 7/2006 | Asada |
| 2006/0250411 A1* | 11/2006 | Oh ........................... G09G 5/04 345/589 |
| 2008/0062193 A1 | 3/2008 | Olson |
| 2008/0158579 A1 | 7/2008 | Ohga et al. |

(Continued)

FOREIGN PATENT DOCUMENTS

| JP | 3796422 B2 | 7/2006 |
| JP | 4347435 B2 | 10/2009 |

(Continued)

OTHER PUBLICATIONS

The Extended European Search Report for the corresponding European Patent Application No. 18176156.0 dated Oct. 26, 2018.

*Primary Examiner* — Barbara D Reinier
(74) *Attorney, Agent, or Firm* — Global IP Counselors, LLP

(57) ABSTRACT

A profile adjustment method is a method of causing a computer to adjust a profile to be used to convert first coordinate values of a first color space into second coordinate values of a second color space. The profile adjustment method includes: accepting one of two or more kinds of profiles as an adjustment target profile among an input profile defining a correspondent relation between the first coordinate values and third coordinate values of a profile connection space, an output profile defining a correspondent relation between the third coordinate values and the second coordinate values, and a link profile defining a correspondent relation between the first coordinate values and the second coordinate values; accepting an adjustment target at coordinates at which an adjustment target color is expressed; and adjusting the adjustment target profile based on the accepted adjustment target.

16 Claims, 21 Drawing Sheets

(56) References Cited

U.S. PATENT DOCUMENTS

| | | |
|---|---|---|
| 2010/0328691 A1 | 12/2010 | Hoshino et al. |
| 2013/0141740 A1* | 6/2013 | Shimbaru .......... G06K 15/1878 358/1.9 |
| 2013/0207996 A1 | 8/2013 | Shibuya |
| 2017/0054877 A1* | 2/2017 | Shibata ................ H04N 1/6019 |
| 2018/0352116 A1 | 12/2018 | Fukasawa |
| 2018/0352117 A1 | 12/2018 | Fukasawa et al. |
| 2018/0376030 A1 | 12/2018 | Yamashita et al. |
| 2019/0104234 A1 | 4/2019 | Yamashita et al. |
| 2019/0124233 A1 | 4/2019 | Fukasawa et al. |
| 2019/0132488 A1 | 5/2019 | Yamashita et al. |
| 2019/0139511 A1 | 5/2019 | Yamashita |
| 2019/0174024 A1 | 6/2019 | Fukasawa et al. |
| 2019/0189081 A1 | 6/2019 | Fukasawa |

FOREIGN PATENT DOCUMENTS

| | | |
|---|---|---|
| JP | 4533153 B2 | 9/2010 |
| JP | 4826659 B2 | 11/2011 |
| JP | 4835284 B2 | 12/2011 |
| JP | 2018-207328 A | 12/2018 |
| JP | 2018-207329 A | 12/2018 |
| JP | 2019-009555 A | 1/2019 |
| JP | 2019-021977 A | 2/2019 |
| JP | 2019-068156 A | 4/2019 |
| JP | 2019-075767 A | 5/2019 |
| JP | 2019-087777 A | 6/2019 |
| JP | 2019-087834 A | 6/2019 |
| JP | 2019-103040 A | 6/2019 |
| JP | 2019-110444 A | 7/2019 |
| JP | 2019-140502 A | 8/2019 |
| JP | 2019-186660 A | 10/2019 |

* cited by examiner

FIG. 3

FIG. 14A   (a-1) SELECT ONLY INPUT PROFILE (A2B)
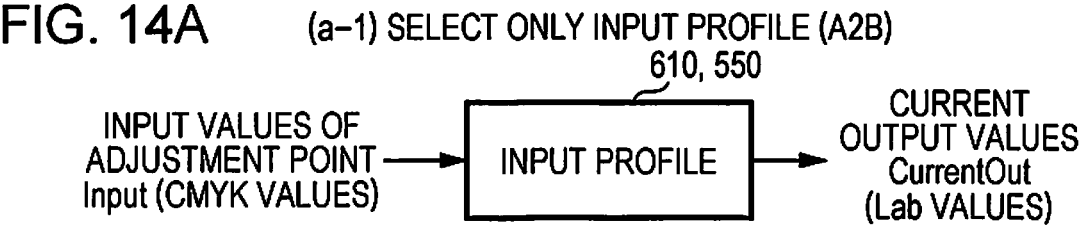
FIG. 14B   (a-2) SELECT ONLY OUTPUT PROFILE (B2A)
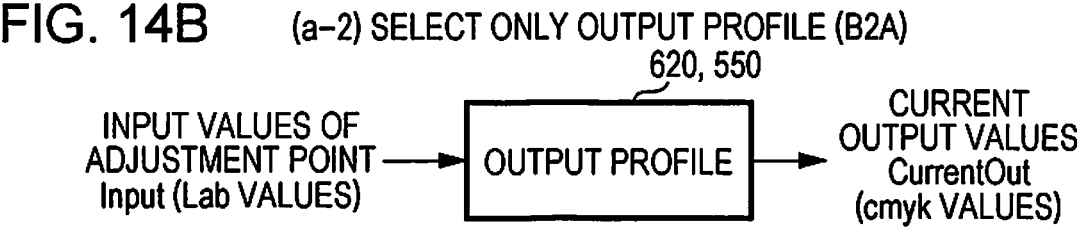
FIG. 14C   (a-3) SELECT DEVICE LINK PROFILE
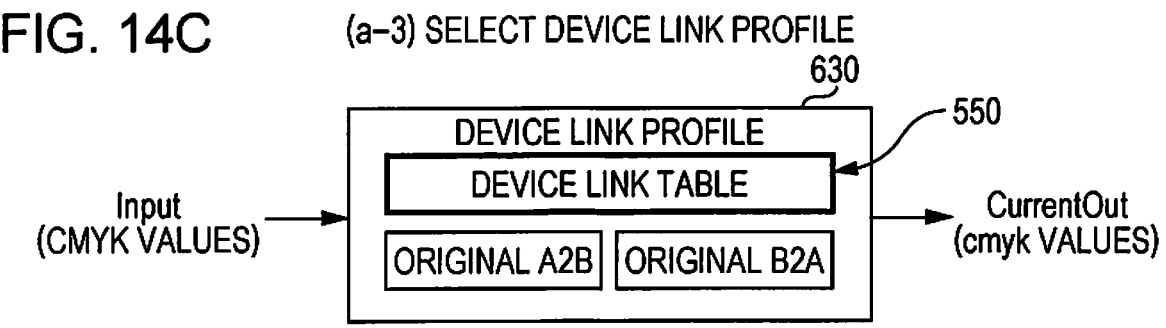
FIG. 14D
(b-1) DESIGNATE INPUT PROFILE IN COMBINATION OF INPUT AND OUTPUT PROFILES
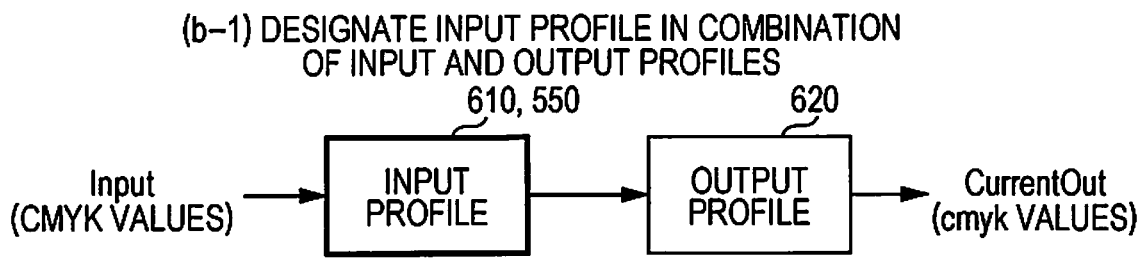
FIG. 14E
(b-2) DESIGNATE OUTPUT PROFILE IN COMBINATION OF INPUT AND OUTPUT PROFILES
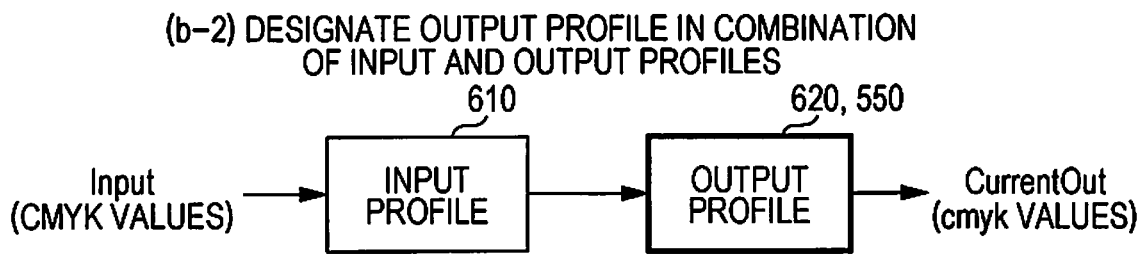

FIG. 15

(a-1) PROFILE IS SINGLY USED: ADJUSTMENT TARGET IS INPUT PROFILE

CurrentOut = $f_{icc}$(InputProfile, A2B, Input)

(a-2) PROFILE IS SINGLY USED: ADJUSTMENT TARGET IS OUTPUT PROFILE

CurrentOut = $f_{icc}$(OutputProfile, B2A, Input)

(a-3) PROFILE IS SINGLY USED: ADJUSTMENT TARGET IS DEVICE LINK PROFILE

CurrentOut = $f_{icc}$(DLProfile, A2B0, Input)

(b-1) PROFILE IS COMBINED TO BE USED: ADJUSTMENT TARGET IS INPUT PROFILE

CurrentOut = $f_{icc}$(OutputProfile, B2A, $f_{icc}$(InputProfile, A2B, Input))

(b-2) PROFILE IS COMBINED TO BE USED: ADJUSTMENT TARGET IS OUTPUT PROFILE

CurrentOut = $f_{icc}$(OutputProfile, B2A, $f_{icc}$(InputProfile, A2B, Input))

HEREIN,
InputProfile IS INPUT PROFILE,
OutputProfile IS OUTPUT PROFILE,
DLProfile IS DEVICE LINK PROFILE,
$f_{icc}$ INDICATES COLOR CONVERSION BY ICC PROFILE,
FIRST ARGUMENT IS PROFILE NAME,
A2B OF SECOND ARGUMENT INDICATES CONVERSION FROM DEVICE COLOR
TO DEVICE-INDEPENDENT COLOR,
B2A OF SECOND ARGUMENT INDICATES CONVERSION FROM DEVICE-INDEPENDENT COLOR
TO DEVICE COLOR,
A2B0 OF SECOND ARGUMENT INDICATES CONVERSION BY DEVICE LINK TABLE,
THIRD ARGUMENT IS INPUT VALUES OF ADJUSTMENT POINTS (CMYK, RGB, Lab, OR THE LIKE).

FIG. 16A  (a-1) SELECT ONLY INPUT PROFILE (A2B)
(a-1-1) SELECT INPUT COLOR SPACE IN ADJUSTMENT TARGET COLOR SPACE

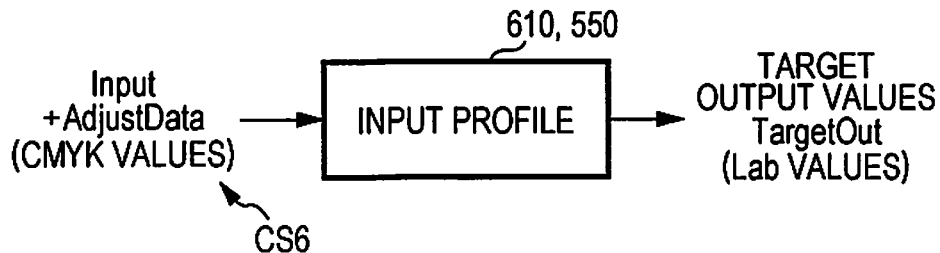

FIG. 16B  (a-1) SELECT ONLY INPUT PROFILE (A2B)
(a-1-2) SELECT OUTPUT COLOR SPACE IN ADJUSTMENT TARGET COLOR SPACE

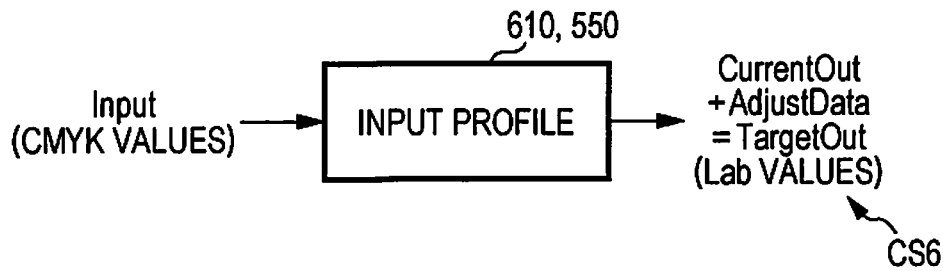

FIG. 16C  (a-2) SELECT ONLY OUTPUT PROFILE (B2A)
(a-2-1) SELECT INPUT COLOR SPACE IN ADJUSTMENT TARGET COLOR SPACE

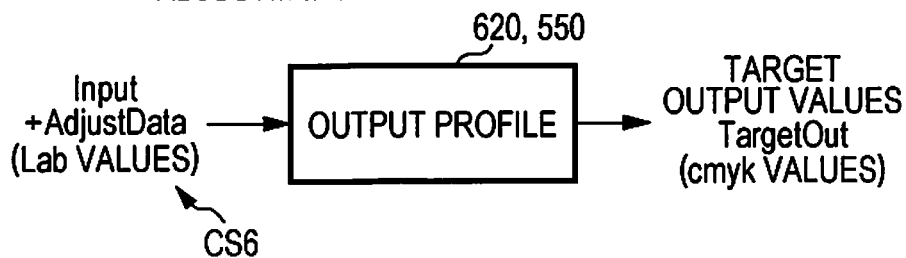

FIG. 16D  (a-2) SELECT ONLY OUTPUT PROFILE (B2A)
(a-2-2) SELECT OUTPUT COLOR SPACE IN ADJUSTMENT TARGET COLOR SPACE

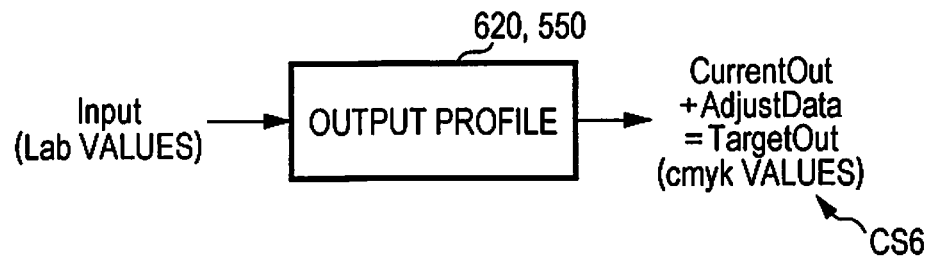

(a-1) PROFILE IS SINGLY USED: ADJUSTMENT TARGET IS INPUT PROFILE (a-1-1) SELECT INPUT COLOR SPACE IN ADJUSTMENT TARGET COLOR SPACE
TargetOut = $f_{icc}$(InputProfile, A2B, Input + AdjustData)
(a-1-2) SELECT OUTPUT COLOR SPACE IN ADJUSTMENT TARGET COLOR SPACE
TargetOut = $f_{icc}$(InputProfile, A2B, Input) + AdjustData

---

(a-2) PROFILE IS SINGLY USED: ADJUSTMENT TARGET IS OUTPUT PROFILE (a-2-1) SELECT INPUT COLOR SPACE IN ADJUSTMENT TARGET COLOR SPACE
TargetOut = $f_{icc}$(OutputProfile, B2A, Input + AdjustData)
(a-2-2) SELECT OUTPUT COLOR SPACE IN ADJUSTMENT TARGET COLOR SPACE
TargetOut = $f_{icc}$(OutputProfile, B2A, Input) + AdjustData

---

(a-3) PROFILE IS SINGLY USED: ADJUSTMENT TARGET IS DEVICE LINK PROFILE (a-3-1) SELECT INPUT COLOR SPACE IN ADJUSTMENT TARGET COLOR SPACE
TargetOut = $f_{icc}$(DLProfile, A2B0, Input + AdjustData)
(a-3-2) SELECT OUTPUT COLOR SPACE IN ADJUSTMENT TARGET COLOR SPACE
TargetOut = $f_{icc}$(DLProfile, A2B0, Input) + AdjustData

---

(b-1) PROFILE IS COMBINED TO BE USED: ADJUSTMENT TARGET IS INPUT PROFILE (b-1-1) SELECT INPUT COLOR SPACE IN ADJUSTMENT TARGET COLOR SPACE
TargetOut
= $f_{icc}$(OutputProfile, B2A, $f_{icc}$(InputProfile, A2B, Input + AdjustData))
(b-1-2) SELECT OUTPUT COLOR SPACE IN ADJUSTMENT TARGET COLOR SPACE
TargetOut
= $f_{icc}$(OutputProfile, B2A, $f_{icc}$(InputProfile, A2B, Input)) + AdjustData
(b-1-3) SELECT PCS IN ADJUSTMENT TARGET COLOR SPACE
TargetOut
= $f_{icc}$(OutputProfile, B2A, $f_{icc}$(InputProfile, A2B, Input) + AdjustData)

---

(b-2) PROFILE IS COMBINED TO BE USED: ADJUSTMENT TARGET IS OUTPUT PROFILE (SAME AS (b-1) CASE)

(b-1) DESIGNATE INPUT PROFILE IN COMBINATION OF INPUT AND OUTPUT PROFILES (b-2) DESIGNATE OUTPUT PROFILE IN COMBINATION OF INPUT AND OUTPUT PROFILES

FIG. 20

| |
|---|
| (a-1) PROFILE IS SINGLY USED: ADJUSTMENT TARGET IS INPUT PROFILE<br><br>Input_P = Input<br>TargetOut_P = TargetOut |
| (a-2) PROFILE IS SINGLY USED: ADJUSTMENT TARGET IS OUTPUT PROFILE<br><br>(SAME AS (a-1) CASE) |
| (a-3) PROFILE IS SINGLY USED: ADJUSTMENT TARGET IS DEVICE LINK PROFILE<br><br>(SAME AS (a-1) CASE) |
| (b-1) PROFILE IS COMBINED TO BE USED: ADJUSTMENT TARGET IS INPUT PROFILE<br><br>Input_P = Input<br>TargetOut_P = $f_{icc}$(OutputProfile, A2B, TargetOut) |
| (b-2) PROFILE IS COMBINED TO BE USED: ADJUSTMENT TARGET IS OUTPUT PROFILE<br><br>Input_P = $f_{icc}$(InputProfile, A2B, Input)<br>TargetOut_P = TargetOut |

PROFILE ADJUSTMENT METHOD, AND PROFILE ADJUSTMENT DEVICE

BACKGROUND

1. Technical Field

The present invention relates to a technology for adjusting a profile used to convert coordinate values of a color space.

2. Related Art

When an ink jet printer is used to calibrate printing such as offset printing, color reproduction precision to be requested (the degree of accurately color reproduction) is very high. As a mechanism for realizing the color reproduction precision, there is a color management system that uses an international color consortium (ICC) profile. The ICC profile is data indicating a correspondent relation between device-independent color and a device-dependent color of a color device such as a printer (for example, an offset printer) or an ink jet printer. The device-dependent color of a printer or an ink jet printer is expressed by, for example, CMYK values indicating use amounts of cyan (C), magenta (M), yellow (Y), and black (K). The device-dependent color is expressed by, for example, saturation values of a CIE (international commission on illumination) L*a*b* color space ("*" is omitted and Lab values are used) or saturation values of a CIE XYZ color space which is a device-independent color space.

Here, an ICC profile of a printer is referred to as an input profile and an ICC profile of an ink jet printer is referred to as an output profile. When CMYK values (referred to as $CMYK_t$ values) in a printer are converted into saturation values (for example, Lab values) of a profile connection space (PCS) according to an input profile, the saturation values can be converted into CMYK values (referred to as $CMYK_p$ values) of the ink jet printer according to an output profile. When printing is executed by an ink jet printer according to the $CMYK_p$ values, colors closes to colors of a printer can be reproduced with the ink jet printer. Actually, expected colors may not be reproduced due to an error of a profile, a color measurement error, a variation in a printer, or the like in some cases. In these cases, conversion precision of target colors is improved by correcting the ICC profile.

JP-A-2003-87589 discloses a method of adjusting input values (Lab values) of an output profile for a CMYK printer to adjust color reproduction of the CMYK printer using a calibrator as a target device. Output values (CMYK values) of an output profile are invariable and an input profile is also invariable.

A user who uses the above-described color management system desires to set targets of $CMYK_t$ values in a printer or $CMYK_p$ values in an inkjet printer in some cases. In the profile adjustment method disclosed in JP-A-2003-87589, only targets of Lab values can be set and targets of $CMYK_t$ values or $CMYK_p$ values may not be set.

The above-described problem is not limited to an adjustment case of a profile targeting an inkjet printer and may also arise even when a profile targeting various color devices is adjusted.

SUMMARY

An advantage of some aspects of the invention is that it is provides a technology capable of improving convenience of work for adjusting a profile to be used to convert coordinate values of a color space.

According to an aspect of the invention, there is provided a profile adjustment method of causing a computer to adjust a profile to be used to convert first coordinate values of a first color space into second coordinate values of a second color space. The profile adjustment method includes: accepting one of two or more kinds of profiles as an adjustment target profile among an input profile defining a correspondent relation between the first coordinate values and third coordinate values of a profile connection space, an output profile defining a correspondent relation between the third coordinate values and the second coordinate values, and a link profile defining a correspondent relation between the first coordinate values and the second coordinate values; accepting an adjustment target at coordinates at which an adjustment target color is expressed; and adjusting the adjustment target profile based on the accepted adjustment target.

According to another aspect of the invention, there is provided a profile adjustment method of causing a computer to adjusting a profile defining a correspondent relation between input coordinate values of an input color space and output coordinate values of an output color space. The profile adjustment method includes: accepting one of two or more kinds of color spaces as an adjustment target color space among the input color space, the output color space, and a profile connection space when the input color space and the output color space are not the profile connection space; accepting an adjustment target at coordinates at which an adjustment target color is expressed in the adjustment target color space; and adjusting the profile based on the accepted adjustment target.

According to still another aspect of the invention, there is provided a profile adjustment program causing a computer to realize functions corresponding to the steps of the above-described profile adjustment method.

According to still another aspect of the invention, there is provided a profile adjustment device including units corresponding to the steps of the above-described profile adjustment method.

According to still another aspect of the invention, there is provided a profile adjustment system including units corresponding to the steps of the above-described profile adjustment method.

In this case, it is possible to provide a technology for improving convenience of work for adjusting a profile to be used to convert coordinate values of a color space.

BRIEF DESCRIPTION OF THE DRAWINGS

The invention will be described with reference to the accompanying drawings, wherein like numbers reference like elements.

FIG. 3 is a diagram schematically illustrating examples of various profiles.

FIGS. 14A to 14E are diagrams schematically illustrating calculation examples of current output values.

FIG. 15 is a diagram schematically illustrating an example of an expression for calculating current output values.

FIGS. 16A to 16D are diagrams schematically illustrating a calculation example of target output values according to an adjustment target color space.

FIG. 18 is a diagram schematically illustrating an example of an expression for calculating target output values.

FIG. 20 is a diagram schematically illustrating an example of an expression for calculating input values and adjustment target values of an adjustment target profile.

DESCRIPTION OF EXEMPLARY EMBODIMENTS

Figure 1:
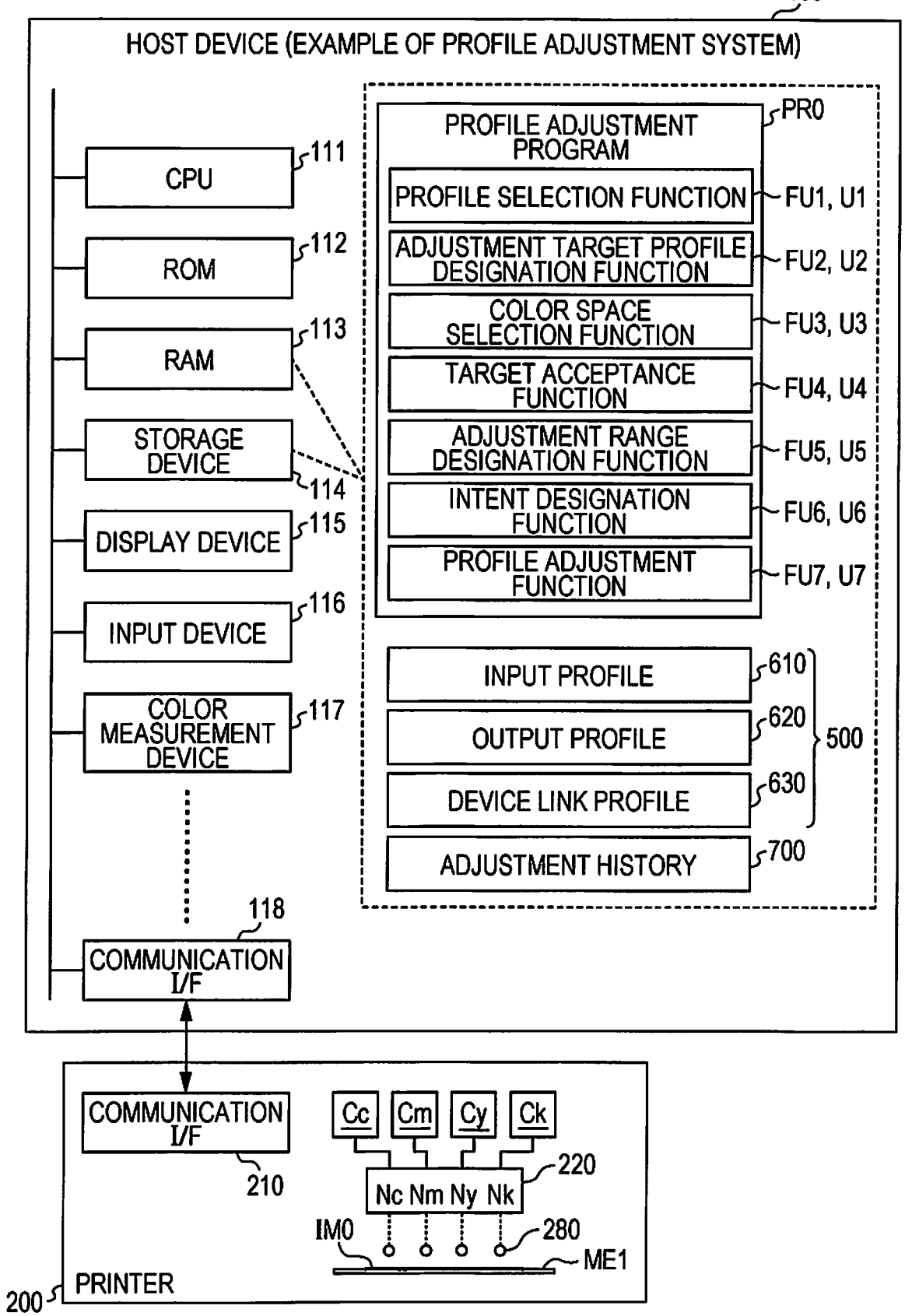
FIG. 1 is a block diagram schematically illustrating a configuration example of a profile adjustment system.

Hereinafter, embodiments will be described. Of course, the following embodiments are merely examples of the invention and all the characteristics described in the embodiments are not necessarily resolutions of the invention.
(1) Overview Of Technology Included in Invention First, an overview of a technology included in the invention will be described with reference to examples illustrated in FIGS. 1 to 22. The drawings in the present specification are drawings schematically illustrating the examples and magnifications in each direction illustrated in the drawings are different in some cases, and thus each drawing is not consistent in some cases. Of course, elements of the present technology are not limited to specific examples denoted by reference numerals.

Aspect 1

According to an aspect of the technology, a profile adjustment method is a profile adjustment method of causing a computer that includes a central processing device (for example, a CPU 111) and a memory (for example, a ROM 112 and a RAM 113) to adjust a profile 500 to be used to convert first coordinate values (for example, CMYK values) of a first color space CS1 (for example, CMYK color spaces) into second coordinate values (for example, cmyk values) of a second color space CS2 (for example, a cmyk color space). The profile adjustment method includes an adjustment target profile designation step ST2, a target acceptance step ST4, and a profile adjustment step ST7. In the adjustment target profile designation step ST2, one of two or more kinds of profiles is accepted as an adjustment target profile 550 among an input profile 610 defining a correspondent relation between the first coordinate values and third coordinate values (for example, Lab values) of a profile connection space CS3 (for example, an Lab color space), an output profile 620 defining a correspondent relation between the third coordinate values and the second coordinate values, and a link profile (for example, a device link profile 630) defining a correspondent relation between the first coordinate values and the second coordinate values. In the target acceptance step ST4, an adjustment target T0 at coordinates at which an adjustment target color (for example, an adjustment point P0) is expressed is accepted. In the profile adjustment step ST7, the adjustment target profile 550 is adjusted based on the accepted adjustment target T0.

In the foregoing Aspect 1, a profile adjustment target can be designated from two or more kinds of profiles among the input profile 610, the output profile 620, and the link profile (630). Accordingly, this aspect can provide the profile adjustment method capable of improving convenience of work for adjusting the profile used to convert the coordinate values of the color space.

Here, the profile connection space includes color spaces such as a CIE Lab color space and a CIE XYZ color space.

The first color space includes the CMYK color space, the CMY color space, and the RGB color space. R stands for red, G stands for green, and B stands for blue.

The second color space includes the CMYK color space, the CMY color space, and the RGB color space. In the following embodiment, the second color space is notated as the cmyk color space to distinguish the second color space from the CMYK color space which is the first color space when the second color space is the CMYK color space.

The coordinates at which the adjustment target color may be expressed with the first coordinate values of the first color space, may be expressed with the second coordinate values of the second color space, or may be expressed with the third coordinate values of the profile connection space.

The adjustment target at the coordinates at which the adjustment target color is expressed may be expressed with the coordinate values of the color spaces or may be expressed with differences from the current coordinate values of the color space.

Aspect 2

Figure 6:
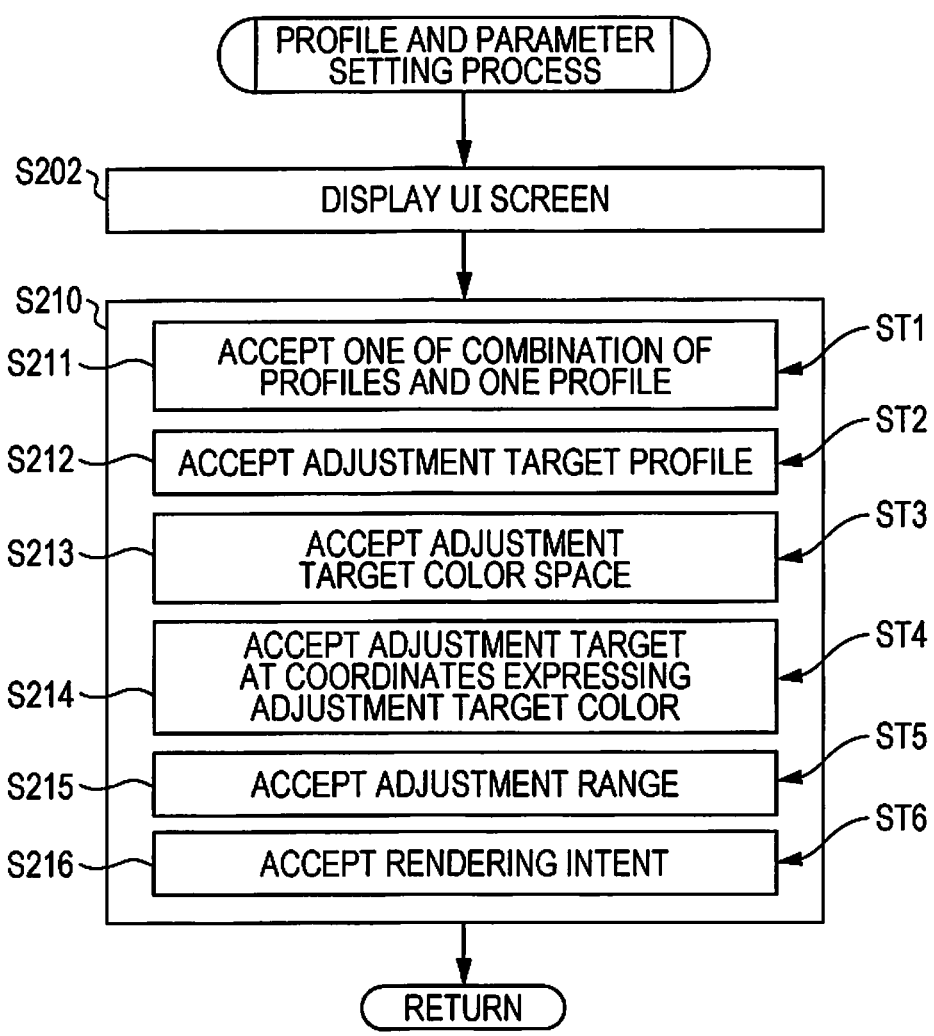
FIG. 6 is a flowchart illustrating an example of a profile and parameter setting process.
Figure 7:
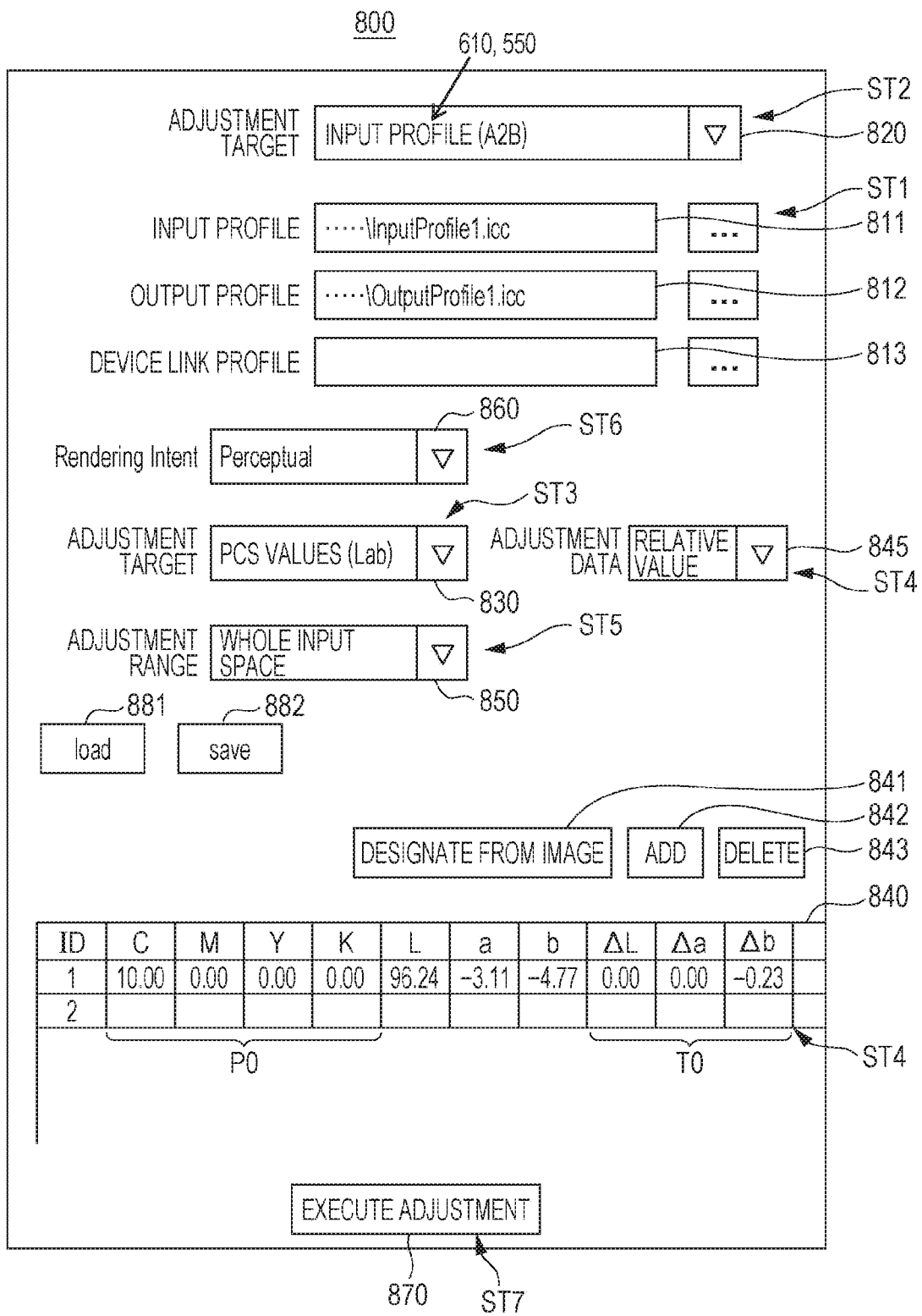
FIG. 7 is a diagram schematically illustrating an example of a user interface screen.

As exemplified in FIGS. 6, 7, and the like, the profile adjustment method may further include a profile selection step ST1 of accepting one of a combination of profiles to be used to convert the first coordinate values to the second coordinate values and one profile which is the adjustment target profile 550 to be used to convert the first coordinate values into the second coordinate values. In the adjustment target profile designation step ST2, one of two or more kinds of profiles is accepted as the adjustment target profile 550 among the input profile 610, the output profile 620, and the link profile (630) when the combination of the profiles is accepted profile selection step ST1.

For example, when color conversion is executed, it is preferable to combine the input profile and the output profile for use in color conversion. On the other hand, when color reproduction precision of a single profile is desired to be improved as in spot color matching or the like, it is preferable to use the single profile for color conversion. This aspect can provide a technology for further improving convenience of work for adjusting the profile used to convert the coordinate values of the color space since one of the combination of the profiles and the one profile is accepted for conversion of the coordinate values of the color space.

Although not included in the foregoing Aspect 2, the technology also include a case in which one profile to be used to convert the first coordinate values to the second coordinate values is not accepted.

Aspect 3

As exemplified in FIG. 7 and the like, the one profile which is the adjustment target profile to be used to convert the first coordinate values into the second coordinate values may include at least one of the input profile 610 in which the second coordinate values are coordinate values (for example, the Lab values) of the profile connection space (for example, the Lab color space) and the output profile 620 in which the first coordinate values are the coordinate values of the profile connection space. This aspect can provide a technology for further improving convenience of work for adjusting the profile used to convert the coordinate values of the color space since at least one of the input profile and the output profile is accepted for conversion of the coordinate values of the color space.

Aspect 4

As exemplified in FIGS. 6, 7, and the like, the profile adjustment method may further include a color space selection step ST3 of accepting one of two or more kinds of color spaces as the adjustment target color space CS6 among the first color space CS1, the second color space CS2, and the profile connection space CS3. In the target acceptance step ST4, the adjustment target T0 at the coordinates at which the adjustment target color (P0) is expressed in the adjustment target color space CS6 is accepted. In this aspect, the adjustment target of the coordinate values of the profile can be selected from two or more kinds of coordinate values among the first coordinate values of the first color space CS1, the second coordinate values of the second color space CS2, and the third coordinate values of the profile connection space CS3. Accordingly, this aspect can provide the technology for further improving convenience of work for adjusting the profile used to convert the coordinate values of the color space.

Aspect 5

As exemplified in FIGS. 6, 7, and the like, the profile adjustment method may further include an adjustment range designation step ST5 of accepting an adjustment range A0 adjusted based on the adjustment target T0 of the adjustment target profile 550 in the first color space CS1. In the profile adjustment step ST7, the adjustment range A0 of the adjustment target profile 550 may be adjusted based on the adjustment target T0. This aspect can provide the technology for further improving convenience of work for adjusting the profile used to convert the coordinate values of the color space since the adjustment range A0 adjusted based on the target in the adjustment target profile 550 can be designated in the first color space CS1.

Here, the adjustment range is not limited to a part of the first color space and may be the whole first color space.

Although not included in the foregoing Aspect 5, the technology also includes a case in which the adjustment range is fixed.

Aspect 6

Figure 5:
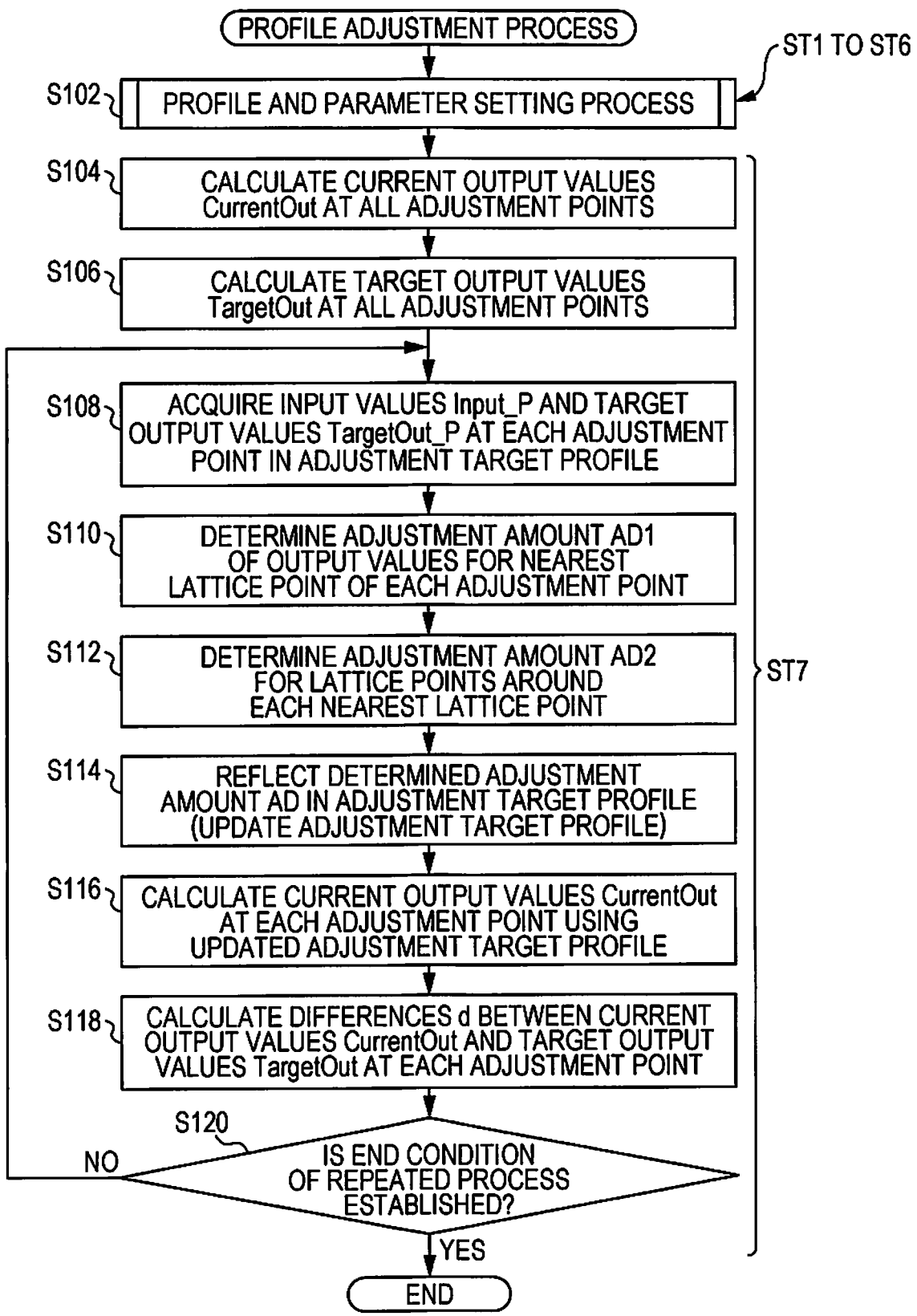
FIG. 5 is a flowchart illustrating an example of a profile adjustment process.
Figure 17A:
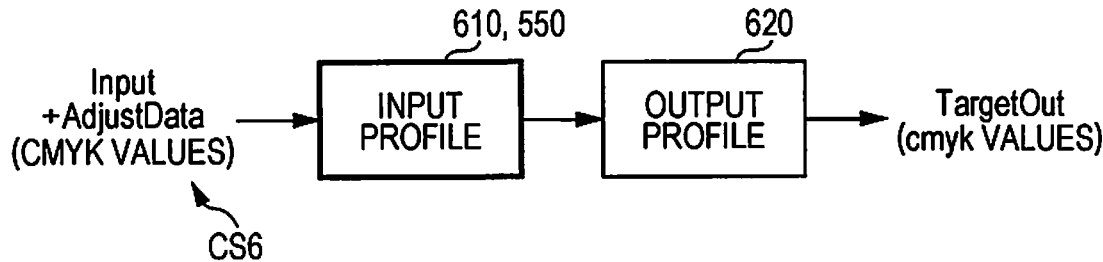
FIGS. 17A to 17C are diagrams schematically illustrating a calculation example of target output values according to an adjustment target color space.
Figure 17B:
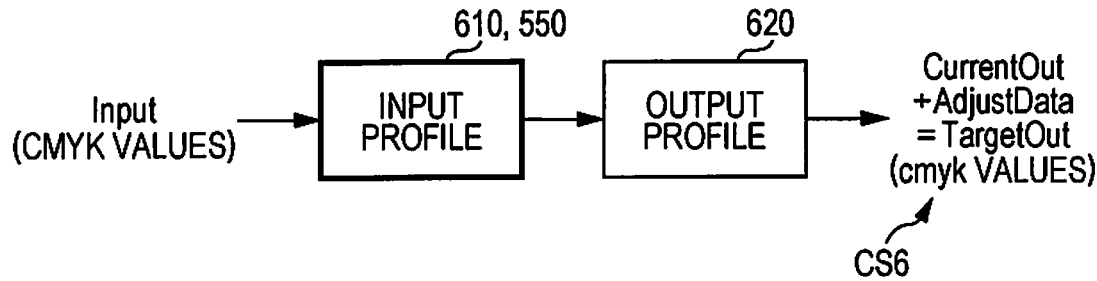
Figure 17C:
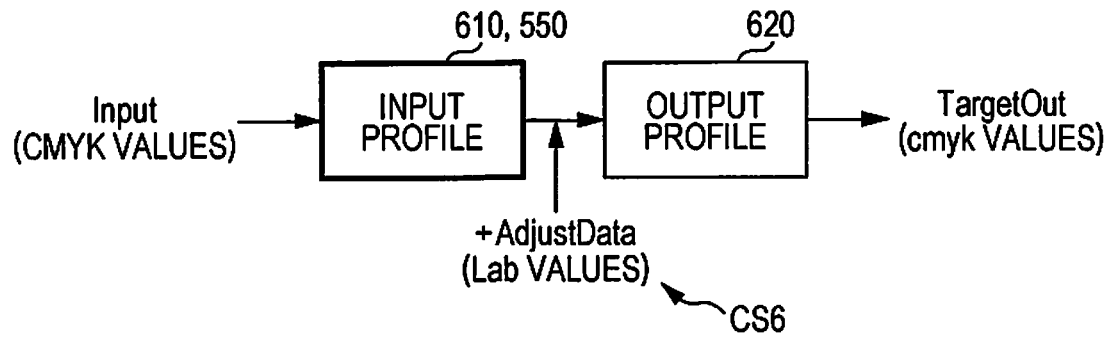

As exemplified in FIGS. 5, 17A, 17C, and the like, in the profile adjustment step ST7, when the adjustment target T0 is not expressed with the second coordinate values, the second coordinate values corresponding to the adjustment target T0 may be obtained as target output values TargetOut, and the adjustment target profile 550 may be adjusted so that the second coordinate values obtained according to the input profile 610 and the output profile 620 or the link profile (630) from the first coordinate values corresponding to coordinates at which the adjustment target color (P0) is expressed are close to the target output values TargetOut. This aspect can provide a technology for improving color reproduction precision since the adjustment target profile 550 is adjusted using the second coordinate values at which an output color is expressed as a reference.

Here, in the profile adjustment step ST7, the adjustment target profile 550 may be adjusted by repeating a calculation process of approaching the obtained second coordinate values to the target output values TargetOut.

Although not included in the foregoing Aspect 6, the technology also include adjusting the adjustment target profile so that the third coordinate values of the profile connection space or the first coordinate values of the first color space are closed to the target values.

Aspect 7

Figure 19A:
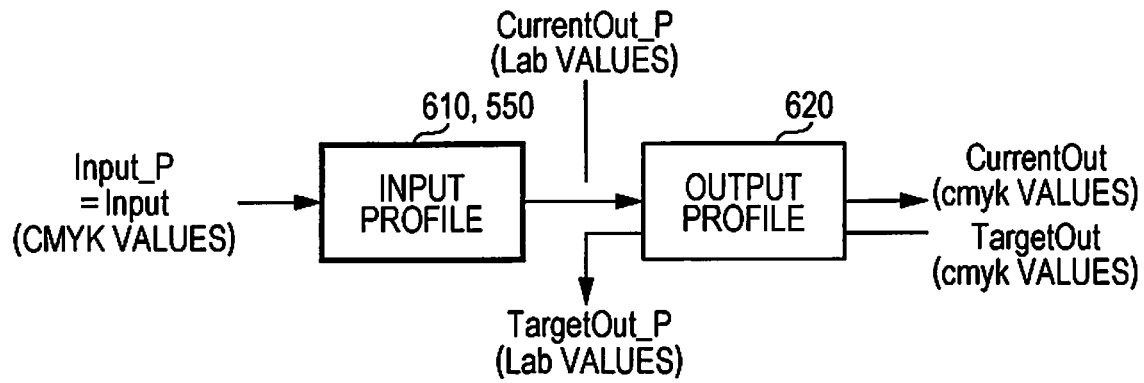
FIGS. 19A and 19B are diagrams schematically illustrating an example in which input values and adjustment target values of an adjustment target profile are obtained.

As exemplified in FIG. 19A and the like, in the profile adjustment step ST7, when the input profile 610 is accepted as the adjustment target profile 550, adjustment target values TargetOut_P expressed with the third coordinate values may be obtained from the adjustment target T0 (for example, the target output values TargetOut) expressed with the second coordinate values. In the profile adjustment step ST7, the adjustment target profile 550 may be adjusted using the adjustment target values TargetOut_P and coordinates (for example, input values Input_P) at which the adjustment target color (P0) expressed with the first coordinate values. This aspect can provide the technology for improving color reproduction precision when the input profile is accepted as the adjustment target profile.

Aspect 8

Figure 19B:
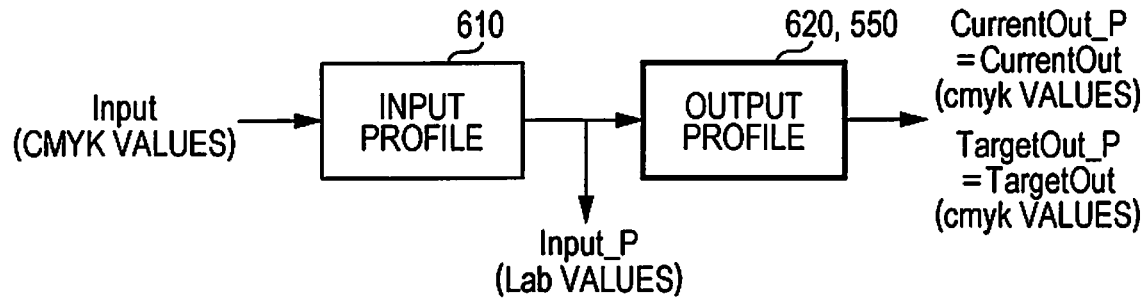

As exemplified in FIG. 19B and the like, in the profile adjustment step ST7, when the output profile 620 is accepted as the adjustment target profile 550, input values Input_P expressed with the third coordinate values may be obtained from coordinates (for example, input values Input) at which the adjustment target color (P0) expressed with the first coordinate values is expressed. Further, in the profile adjustment step ST7, the adjustment target profile 550 may be adjusted using the input values Input_P and the adjustment target T0 (for example, the adjustment target values TargetOut_P) expressed with the second coordinate values. This aspect can provide the technology for improving color reproduction precision when the output profile is accepted as the adjustment target profile.

Aspect 9

As exemplified in FIGS. 6, 7, and the like, the profile adjustment method may further include an intent designation step ST6 of accepting one of a plurality of rendering intents for defining a correspondent relation of the adjustment target profile 550 as a designation intent. In the profile adjustment step ST7, the adjustment target profile 550 may be adjusted in a correspondent relation in accordance with the designation intent. This aspect can provide the technology for further improving convenience of work for adjusting the profile used to convert the coordinate values of the color space.

Here, the rendering intent includes, for example, "Perceptual", "Media-Relative Colorimetric", "Absolute Colorimetric", and "Saturation". For example, two or more kinds of rendering intents of the four kinds of rendering intents may be set as designation targets.

Although not included in the foregoing Aspect 9, the technology also includes a case in which no designation intent is accepted.

Aspect 10

Incidentally, according to an aspect of the technology, a profile adjustment method is a profile adjustment method of causing a computer that includes a central processing device (for example, the CPU 111) and a memory (for example, the ROM 112 and the RAM 113) to adjust the profile 500 defining a correspondent relation between input coordinate values of the input color space CS4 and output coordinate values of the output color space CS5. The profile adjustment method includes a color space selection step ST3, the target acceptance step ST4, and the profile adjustment step ST7. In the color space selection step ST3, one of two or more kinds of color spaces is accepted as an adjustment target color space CS6 among the input color space CS4, the output color space CS5, and the profile connection space CS3 when the input color space CS4 and the output color space CS5 are not the profile connection space CS3. In the target acceptance step ST4, an adjustment target T0 at coordinates at which an adjustment target color (for example, an adjustment point P0) is expressed in the adjustment target color space CS6 is accepted. In the profile adjustment step ST7, the profile 500 is adjusted based on the accepted adjustment target T0.

In the foregoing Aspect 10, the adjustment target of the coordinate values of the profile can be selected from two or more kinds of color spaces among the coordinate values of the input color space CS4 in the profile, the coordinate values of the output color space CS5 in the profile, and the profile connection space CS3 when the input color space CS1 and the output color space CS2 are not the profile connection space CS3. Accordingly, this aspect can provide the technology for improving convenience of work for adjusting the profile used to convert the coordinate values of the color space.

Here, the input color space includes a CMYK color space, a CMY color space, an RGB color space, a CIE Lab color space, and a CIE XYZ color space.

The output color space includes a CMYK color space, a CMY color space, an RGB color space, a CIE Lab color space, and a CIE XYZ color space.

Aspect 11

As exemplified in FIGS. 5, 16A, 16C, and the like, in the profile adjustment step ST7, when the adjustment target T0 is not expressed with the output coordinate values, the output coordinate values corresponding to the adjustment target T0 may be obtained as the target output values TargetOut, and the profile may be adjusted so that the output coordinate values obtained according to the current profile from the input coordinate values corresponding to coordinates at which the adjustment target color (P0) is expressed are close to the target output values TargetOut. This aspect can provide the technology for improving the color reproduction precision since the profile is adjusted using the output coordinate values as a reference.

Here, in the profile adjustment step ST7, the profile 500 may be adjusted by repeating a calculation process of approaching the obtained output coordinate values to the target output values TargetOut.

Although not included in the foregoing Aspect 11, the technology also includes adjusting the profile so that the input coordinate values are close to the target values.

Aspect 12

As exemplified in FIG. 7 and the like, in the target acceptance step ST4, selection of one of an option (A) in which the adjustment target T0 is accepted as coordinate values (for example, T_L, T_a, T_b illustrated in FIG. 11B) of a color space and an option (B) in which the adjustment target T0 is accepted as differences (for example, ΔL, Δa, Δb illustrated in FIG. 7) from current coordinate values (for example, C_L, C_a, C_b illustrated in FIG. 11B) of the color space may be accepted. In the target acceptance step ST4, the adjustment target T0 may be accepted as the coordinate values of the color space when the option (A) is selected. The adjustment target T0 may be accepted as differences from the current coordinate values of the color space when the option (B) is selected. This aspect can provide the technology for further improving convenience of work for adjusting the profile used to convert the coordinate values of the color space.

Although not included in the foregoing Aspect 12, the technology also includes a case in which there is no option described above.

Aspect 13

Incidentally, according to an aspect of the technology, a profile adjustment program PRO causes a computer to realize functions corresponding to the steps of Aspect 1, that is, an adjustment target profile designation function FU2 corresponding to the adjustment target profile designation step ST2, a target acceptance function FU4 corresponding to the target acceptance step ST4, and a profile adjustment function FU7 corresponding to the profile adjustment step ST7. Accordingly, this aspect can provide the profile adjustment method capable of improving convenience of work for adjusting the profile used to convert the coordinate values of the color space. The profile adjustment program may also cause a computer to realize a profile selection function FU1 corresponding to the profile selection step ST1, a color space selection function FU3 corresponding to the color space selection step ST3, an adjustment range designation function FU5 corresponding to the adjustment range designation step ST5, and an intent designation function FU6 corresponding to the intent designation step ST6.

Aspect 14

According to another aspect of the technology, the profile adjustment program PRO causes a computer to functions corresponding to the steps of Aspect 10, that is, the color space selection function FU3 corresponding to the color space selection step ST3, the target acceptance function FU4 corresponding to the target acceptance step ST4, and the profile adjustment function FU7 corresponding to the profile adjustment step ST7. This aspect can provide the profile adjustment program improving convenience of the work for adjusting the profile used to convert the coordinate values of the color space.

Aspect 15

Further, according to an aspect of the technology, a profile adjustment device (included in, for example, a host device 100) includes units corresponding to the steps of Aspect 1, that is, an adjustment target profile designation unit U2 corresponding to the adjustment target profile designation step ST2, a target acceptance unit U4 corresponding to the target acceptance step ST4, and a profile adjustment unit U7 corresponding to the profile adjustment step ST7. This aspect can provide a profile adjustment device improving convenience of the work for adjusting the profile used to convert the coordinate values of the color space. The profile adjustment device may include a profile selection unit U1 corresponding to the profile selection step ST1, a color space selection unit U3 corresponding to the color space selection step ST3, an adjustment range designation unit U5 corresponding to the adjustment range designation step ST5, and an intent designation unit U6 corresponding to the intent designation step ST6.

Aspect 16

Further, according to another aspect of the technology, a profile adjustment device (included in, for example, the host device 100) includes units corresponding to the steps of Aspect 10, that is, the color space selection unit U3 corresponding to the color space selection step ST3, the target acceptance unit U4 corresponding to the target acceptance step ST4, and the profile adjustment unit U7 corresponding to the profile adjustment step ST7. This aspect can provide a profile adjustment device improving convenience of the work for adjusting the profile used to convert the coordinate values of the color space.

Aspect 17

Further, according to an aspect of the technology, a profile adjustment system includes a printing device (for example, a printer 200) that prints a color chart including a patch, a color measurement device 117 that measures color of the patch, and the units U2, U4, and U7 of Aspect 15. The system can set the adjustment target T0 based on the measurement color values of the patch of the color chart printed using the profile 500 including the adjustment target profile 550 and can use the measurement color values for adjusting the adjustment target profile 550. This aspect can provide the profile adjustment system improving convenience of the work for adjusting the profile used to convert the coordinate values of the color space. The profile adjustment system may include the profile selection unit U1, the color space selection unit U3, the adjustment range designation unit U5, and the intent designation unit U6.

Aspect 18

Further, according to another aspect of the technology, a profile adjustment system includes a printing device (for example, the printer 200) that prints a color chart including a patch, the color measurement device 117 that measures color of the patch, and the units U3, U4, and U7 of Aspect 16. The system can set the adjustment target T0 based on the measurement color values of the patch of the color chart printed using the profile 500 and can use the measurement color values for adjusting the profile 500. This aspect can provide the profile adjustment system improving convenience of the work for adjusting the profile used to convert the coordinate values of the color space.

Further, the technology can be applied to a method of controlling the profile adjustment device, a complex system including the profile adjustment device, a method of controlling the complex system, a program controlling the profile adjustment device, a program controlling the complex system, a profile adjustment program, and a computer-readable medium recording the control program. The above-described device may be configured with a plurality of distributed portions.

(2) Specific Example Of Profile Adjustment System

FIG. 1 schematically illustrates the host device 100 as a configuration example of the profile adjustment system including a profile adjustment device. In the host device 100, a central processing unit (CPU) 111, a read-only memory (ROM) 112, a random access memory (RAM) 113, a storage device 114, a display device 115, an input device 116, a color measurement device 117, a communication interface (I/F) 118, and the like are connected to each other so information can be mutually input and output. In the specific example, it is assumed that the profile adjustment system includes the color measurement device 117 and the ink jet printer 200 and the profile adjustment device does not include the color measurement device 117 and the ink jet printer 200.

The storage device 114 stores an operating system (OS) (not illustrated), a profile adjustment program PRO, and the like. The operating system, the profile adjustment program PRO, and the like are appropriately read to the RAM 113 to be used for adjustment process for a profile 500. Here, the profile 500 is a generic term of an input profile 610, an output profile 620, and a device link profile 630. At least one of the RAM 113 and the storage device 114 stores various kinds of information, for example, the input profile 610, the output profile 620, the device link profile 630, and adjustment history 700. A nonvolatile semiconductor memory such as a flash memory or a magnetic storage device such as a hard disk can be used as the storage device 114.

A liquid crystal panel or the like can be used as the display device 115. A pointing device, a hard key including a keyboard, a touch panel attached on the surface of a display panel, or the like can be used as the input device 116. The color measurement device 117 can measure each color patch formed on a print substrate which is an example of a medium on which a color chart is formed and can output the color measurement values. The patch is also called a color chart. Color measurement values are considered as, for example, values indicating lightness L and chromaticity coordinates a and b in a CIE Lab color space. The color measurement device 117 may be installed out of the host device 100. The host device 100 acquires color measurement data including a plurality of color measurement values from the color measurement device 117 and executes various processes. The communication I/F 118 is connected to a communication I/F 210 of a printer 200 and inputs and outputs information such as printing data to the printer 200. As the standard of the communication I/F 118 and the communication I/F 210, a universal serial bus (USB), a short-range radio communication standard, or the like can be used. The communication of the communication I/F 118 and the communication I/F 210 may be wired or wireless or may be network communication such as a local area network (LAN) or the Internet.

The profile adjustment program PRO illustrated in FIG. 1 causes the host device 100 to realize the profile selection function FU1, the adjustment target profile designation function FU2, the color space selection function FU3, the target acceptance function FU4, and the adjustment range designation function FU5, the intent designation function FU6, and the profile adjustment function FU7.

The host device 100 includes a computer such as a personal computer (including a tablet terminal). The host device 100 may include all the constituent elements 111 to 118 within a single casing and may also be configured as a plurality of devices separated to be able to communicate with each other. Even when the printer is the host device 100, the technology can be embodied.

The printer 200 illustrated in FIG. 1 is assumed to be an ink jet printer that ejects (discharges) cyan (C) ink, magenta (M) ink, yellow (Y) ink, and black (K) ink as color materials from a recording head 220 and form an output image IMO corresponding to printing data. When ink of cyan, magenta, yellow, and black (CMYK) is supplied from ink cartridges Cc, Cm, Cy, and Ck, respectively, the recording head 220 ejects ink droplets 280 of CMYK from nozzles Nc, Nm, Ny, and Nk. When the ink droplets 280 are landed on a print substrate ME1, ink dots are formed on the print substrate ME1. As a result, it is possible to obtain a printing matter that has an output image IMO on the print substrate ME1.

(3) Specific Example of Color Management System

Next, an example of a color management system to which the technology can be applied will be described with reference to FIG. 2.

Figure 2:
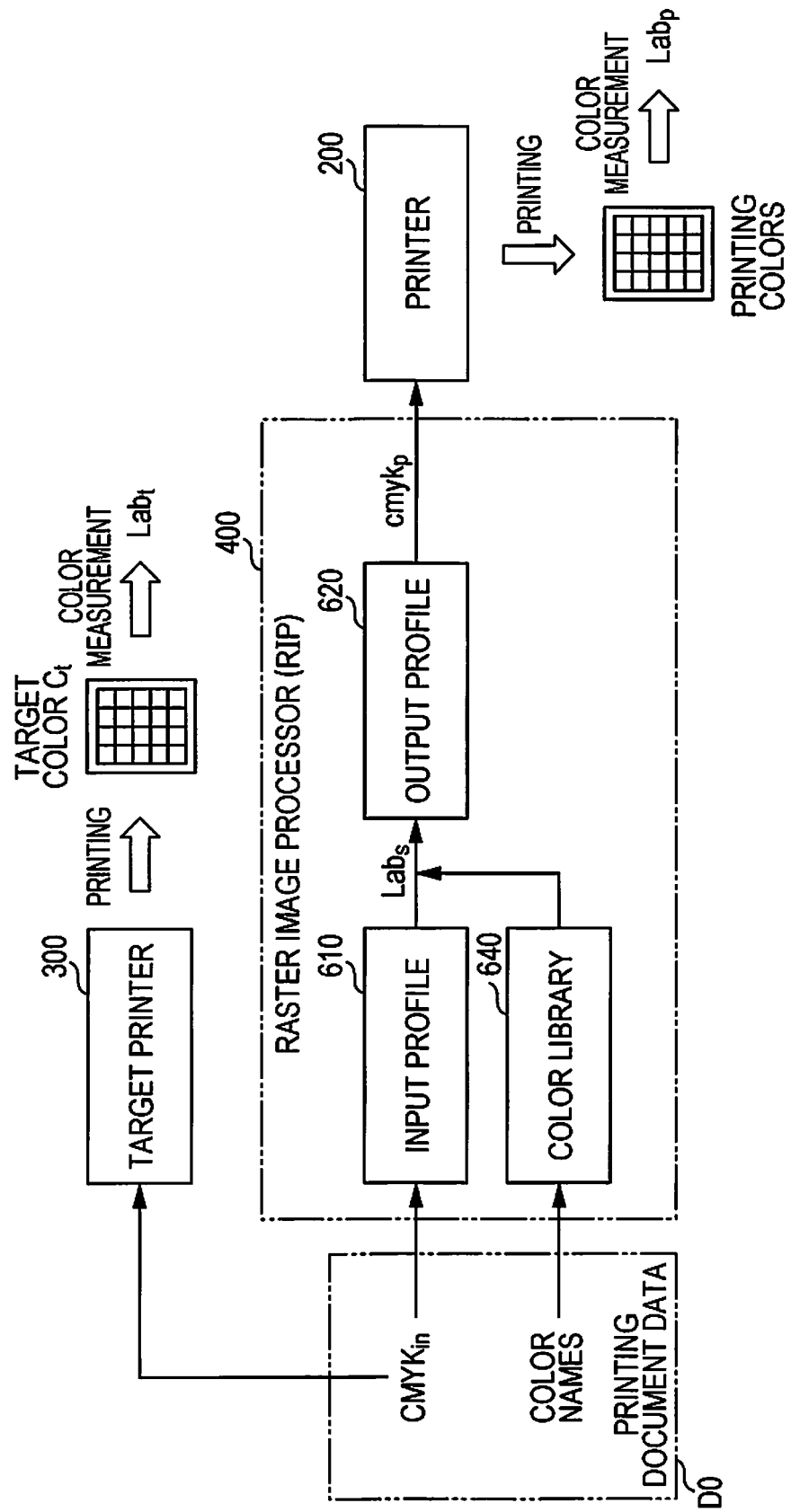
FIG. 2 is a diagram schematically illustrating an example of a color management flow.

In the color management system illustrated in FIG. 2, a raster image processor (RIP) 400 converts printing document data D0 into output data indicating printing colors cyan, magenta, yellow, and black (cmyk$_p$) and causes the ink jet printer 200 to form a printing matter. The printing document data D0 expresses process colors CMYK$_{in}$ for reproducing a targeting color (target color C$_t$) with ink (color materials) of CMYK of a target printer 300 which is an example of a color matching target device. In the printing document data D0, the names of colors of a color library can also be designated. As the color library, for example, a Pantone (registered trademark) color library can be used.

The target printer 300 is assumed to be an offset printer, but a gravure printer, a flexographic printer, or the like may be used. The target color C$_t$ is expressed with, for example, coordinate values (Lab values) of the CIE Lab color space. FIG. 2 illustrates a form in which the target printer 300 prints a color chart expressing the target color C$_t$ on a printing matter and a color measurement device measures colors of each patch of the color chart to acquire color measurement values Lab$_t$. The process colors CMYK$_{in}$ correspond to use amounts of ink of CMYK used by the target printer 300 and express coordinates of the CMYK color space which depends on the target printer 300.

The RIP 400 includes the input profile 610, the output profile 620, and a color library 640. The input profile 610 is a file that describes color characteristics of ink used by the target printer 300. The output profile 620 is a file that describes color characteristics of ink used by the ink jet printer 200. For both the profiles 610 and 620, for example, a data format of an ICC profile can be used. The process colors CMYK$_{in}$ of the printing document data D0 are converted into colors Lab$_s$ of the Lab color space according to the input profile 610 and are converted into printing colors cmyk$_p$ according to the output profile 620. When the printer 200 uses ink of a total of four colors of CMYK, the printing colors cmyk$_p$ are output to the printer 200 to be reproduced on a printing matter. FIG. 2 illustrates a form in which the printer 200 prints a color chart expressing the printing colors cmyk$_p$ on a print substrate and a color measurement device measures each patch of the color chart to acquire color measurement values Lab$_p$. When the printer 200 also uses ink such as light cyan (Lc), light magenta (Lm), dark yellow (Dy), and light black (Lk), and the RIP 400 or the printer 200 classifies the printing colors cmyk$_p$ into dark colors and light colors, the printer 200 can reproduce the printing colors cmyk$_p$ on a printing matter. Of course, the printing colors are not limited to the total of four colors of CMYK.

When the names of colors are set in the printing document data D0, the RIP 400 converts the names of the colors into the colors Lab$_s$ of the Lab color space with reference to the color library 640 in some cases.

The RIP 400 has not only the process colors CMYK$_{in}$, but also, for example, process colors expressing use amounts of color materials of only the three primary colors CMY (referred to as CMY$_{in}$) which are subtractive mixture of colors or process colors expressing intensities of the three primary colors red (R), green (G), and blue (B) (referred to as RGB$_{in}$) which are additive mixture of colors, and an input profile for converting coordinate values of the Lab color space. Accordingly, the RIP 400 can convert the process colors CMY$_{in}$ or the process colors RGB$_{in}$ into the printing colors cmyk$_p$ via the Lab color space. In addition, the RIP 400 can also input the colors Lab$_s$ of the Lab color space and convert the colors Lab$_s$ into the printing colors cmyk$_p$.

As described above, colors close to colors of the target printer 300 can be reproduced by the ink jet printer 200. However, actually, expected colors may not be reproduced due to an error of a profile, a color measurement error, a variation in a printer, or the like in some cases. In these cases, conversion precision of target colors is improved by correcting the profiles 610 and 620. When the output profile 620 is corrected, it is considered that Lab$_s$ values in a profile connection space (PCS) are set as target values, color differences between both the colors are calculated using results (Lab$_p$) obtained by measuring colors printed by the printer 200 as current values, and the output profile 620 is corrected to reduce the color differences. When the input profile 610 is corrected, it is considered that data of the color chart is converted into the input profile 610 and the output profile 620, the color chart is printed, color differences between color measurement results (Lab$_p$) of each patch and target saturation values (Lab$_t$) are calculated, and the input profile 610 is corrected to reduce the color differences.

Here, expected colors may not be obtained or it takes some time due to the following reasons.

Reason 1: Since it is necessary to measure colors of printed results, a measurement instrument is necessary and color matching countermeasure may not be taken visually.

Reason 2: When the input profile 610 is corrected, a calculation result of the color differences is fed back to the input profile 610. However, when it is considered that there is a reason of an error in the output profile 620, it is necessary to also correct another input profile. (In this case, by feeding the calculation result back to the output profile 620 and correcting the output profile 620, it is not necessary to correct another output profile.)

In the specific example, the functions FU1 to FU7 realized by the profile adjustment program PRO improve convenience of work for adjusting a profile used to convert coordinate values of the color space and realize further higher color reproduction precision or a gradation property.

(4) Specific Example of Profile

FIG. 3 schematically exemplifies relations between the profiles 610, 620, and 630.

As illustrated in FIG. 3, the input profile 610 is data that defines a correspondent relation between CMYK values (C$_i$, M$_i$, Y$_i$, K$_i$) of the CMYK color space (which is an example of a first color space CS1) and Lab values (L$_i$, a$_i$, b$_i$) of an Lab color space (which is an example of the profile connection space (PCS) CS3) suitable for ink used by the target printer 300. In this case, lattice points GD1 of an A2B table are normally arranged at a substantially equal interval in a C-axis direction, an M-axis direction, a Y-axis direction, and a K-axis direction in the CMYK color space. Here, the variable i is a variable for identifying the lattice points GD1 set in the CMYK color space (CS1). The CMYK values are examples of first coordinate values. The Lab values are examples of the third coordinate values. In the input profile 610, the CMYK color space (CS1) is an example of an input color space CS4 and the Lab color space (CS3) is an example of an output color space CS5.

The output profile 620 is data that defines a correspondent relation between Lab values ($L_j$, $a_j$, $b_j$) of the Lab color space (CS3) and cmyk values ($c_j$, $m_j$, $y_j$, $k_j$) of the cmyk color space (which is example of a second color space CS2) suitable for ink used by the ink jet printer 200. In this case, lattice points GD2 of a B2A table are normally arranged at a substantially equal interval in an L-axis direction, an a-axis direction, and a b-axis direction in the Lab color space. Here, the variable j is a variable for identifying the lattice points GD2 set in the Lab color space (CS3). The reason for expression as the "cmyk color space" is to distinguish a color space suitable for ink used by the printer 200 from a color space suitable for ink used by the target printer 300. The cmyk values are examples of second coordinate values. In the output profile 620, the Lab color space (CS3) is an example of an input color space CS4 and the cmyk color space (CS2) is an example of an output color space CS5.

The device link profile 630 is data that defines a correspondent relation between CMYK values ($C_i$, $M_i$, $Y_i$, $K_i$) of the CMYK color space (CS1) and cmyk values ($c_i$, $m_i$, $y_i$, $k_i$) of an cmyk color space (CS2). Here, the variable i is a variable for identifying the lattice points GD1 set in the CMYK color space (CS1). The device link profile 630 can be obtained by linking the input profile 610 and the output profile 620. In the input profile 610, the CMYK color space (CS1) is an example of an input color space CS4 and the cmyk color space (CS2) is an example of an output color space CS5.

Figure 4:
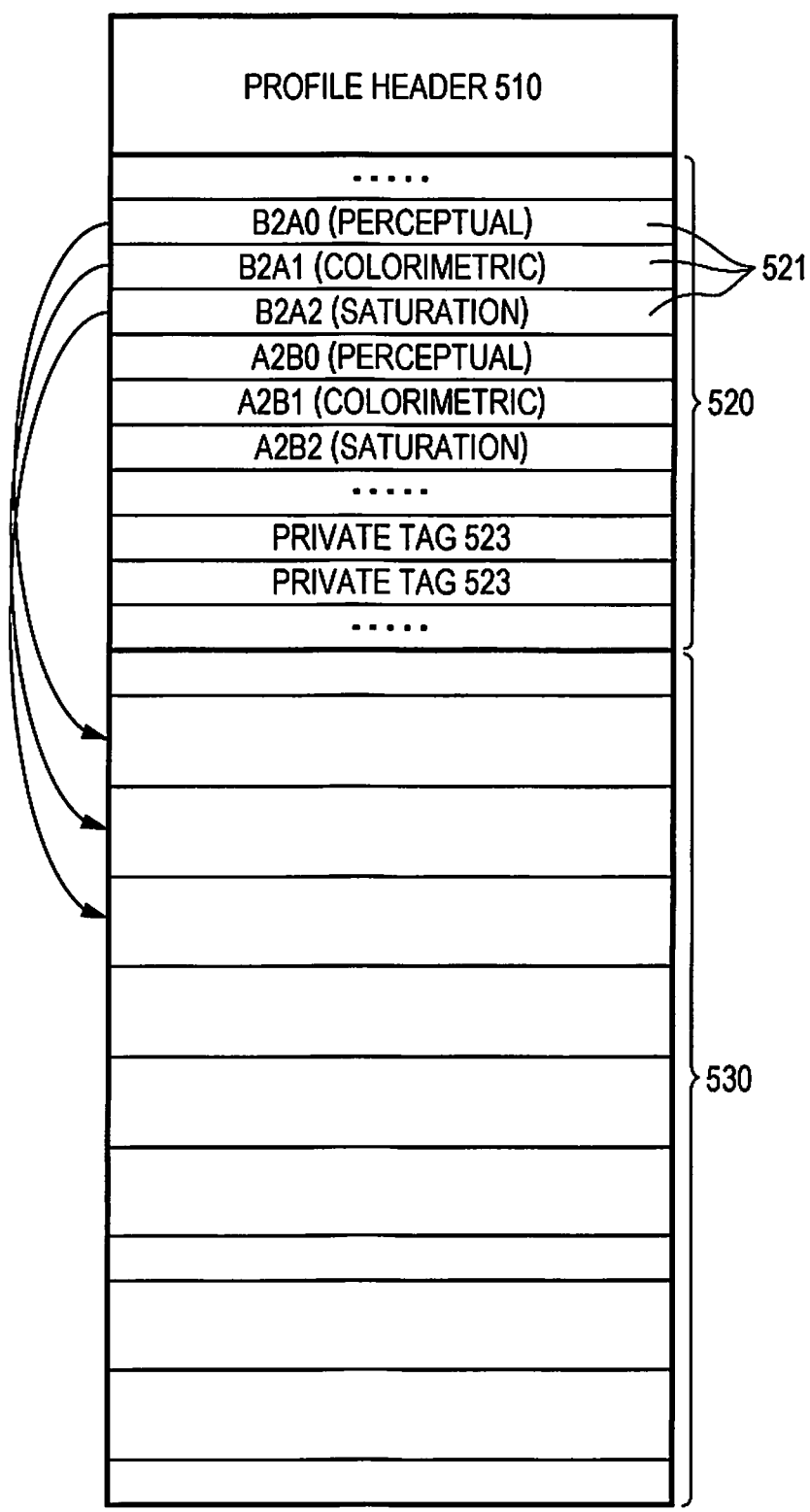
FIG. 4 is a diagram schematically illustrating a structure example of a profile.

FIG. 4 schematically exemplifies the structure of the profile 500. The profile 500 illustrated in FIG. 4 is an ICC profile and includes a profile header 510 and a tag table 520. The profile 500 includes a tag 521 which is information necessary for converting color information between PCS and a device-dependent color space. The tag 521 may include a private tag 523 for customizing the profile 500.

An A2Bx tag (x is 0, 1, or 2 illustrated in FIG. 4) for the device (300 or 200) includes a color conversion table for converting a device-dependent color space (the CMYK color space or the cmyk color space) into the Lab color space, as element data 530. A B2Ax tag for the device (300 or 200) includes the color conversion table for converting the Lab color space into a device-dependent color space (the CMYK color space or the cmyk color space), as the element data 530.

The A2B0 tag and the B2A0 tag illustrated in FIG. 4 are information for executing perceptual color conversion. The perceptual color conversion is mainly used for conversion of a color gamut photo image since gradation reproduction is important. The A2B1 tag and the B2A1 tag illustrated in FIG. 4 are information for executing media-relative colorimetric color conversion or absolute colorimetric color conversion. The colorimetric color conversion is mainly used for color correction output conversion of a digital proof in which accurate color matching is obtained since the colorimetric color conversion is faithful to color measurement values. The A2B2 tag and the B2A2 tag illustrated in FIG. 4 are information for executing saturation color conversion. The saturation-important color conversion is mainly used for conversion of graph display or the like in business graphics since vividness of color is important rather than accuracy of shade.

(5) Specific Example of Profile Adjustment Process Executed in Profile Adjustment System FIG. 5 illustrates an example of the profile adjustment process executed in the host device 100 illustrated in FIG. 1. FIG. 6 illustrates an example of a profile and parameter setting process executed in step S102 of FIG. 5. Of course, these processes can be appropriately changed by changing the order of the processes. FIG. 7 illustrates an example of a user interface (UI) screen 800 displayed in step S202 of FIG. 6. The host device 100 executes a plurality of processes in parallel by multitasking. Here, step S211 of FIG. 6 corresponds to the profile selection step ST1, the profile selection function FU1, and the profile selection unit U1. Step S212 of FIG. 6 corresponds to the adjustment target profile designation step ST2, the adjustment target profile designation function FU2, and the adjustment target profile designation unit U2. Step S213 of FIG. 6 corresponds to the color space selection step ST3, the color space selection function FU3, and the color space selection unit U3. Step S214 of FIG. 6 corresponds to the target acceptance step ST4, the target acceptance function FU4, and the target acceptance unit U4. Step S215 of FIG. 6 corresponds to the adjustment range designation step ST5, the adjustment range designation function FU5, and the adjustment range designation unit U5. Step S216 of FIG. 6 corresponds to the intent designation step ST6, the intent designation function FU6, and the intent designation unit U6. Steps S104 to S120 of FIG. 5 correspond to the profile adjustment step ST7, the profile adjustment function FU7, and the profile adjustment unit U7. Hereinafter, the term "step" will be omitted.

When the profile adjustment process illustrated in FIG. 5 starts, the host device 100 executes the profile and parameter setting process illustrated in FIG. 6 (S102). When the profile and parameter setting process starts, the host device 100 displays a UI screen 800 illustrated in FIG. 7 on the display device 115 (S202 of FIG. 6). The UI screen 800 includes an input profile selection field 811, an output profile selection field 812, a device link profile selection field 813, an adjustment target profile designation field 820, an adjustment target color space selection field 830, a target acceptance region 840, a button 841 of "designate from image", an addition button 842, a deletion button 843, an adjustment data selection field 845, an adjustment range designation field 850, an intent designation field 860, an adjustment execution button 870, a history load button 881, and a history save button 882.

The host device 100 ends the profile and parameter setting process when the input device 116 accepts an operation on the above-described fields and the buttons (S210) and an operation on the adjustment execution button 870 is accepted. The process of S210 includes the following processes S211 to S216:

(S211) a process of accepting selection of one of a combination of the profiles to be used for the change from the CMYK values to the cmyk values and one profile which is an adjustment target profile 550 to be used for the conversion from the CMYK values to the cmyk values;

(S212) a process of receiving one of the profiles 610, 620, and 630 as the adjustment target profile 550;

(S213) a process of accepting one of two or more kinds of color spaces among the CMYK color space (CS1), the cmyk color space (CS2), and the Lab color space (CS3) as an adjustment target color space CS6;

(S214) a process of accepting an input of the adjustment target T0 at coordinates expressing the adjustment point P0 (which is an example of the adjustment target color);

(S215) a process of accepting designation of an adjustment range in which a profile is adjusted based on the target T0 is the adjustment target profile 550 in the CMYK color space (CS1); and (S216) a process of accepting one of a plurality of rendering intents for defining a correspondent relation of the adjustment target profile 550 as a designated intent.

First, the process of S211 will be described with reference to FIGS. 7, 8A to 8D, and 14A to 14E. Here, a component surrounded by a thick line in FIGS. 14A to 14E indicates the adjustment target profile 550. In the device link profile 630 illustrated in FIG. 14C, an adjustment target is a device link table, an "original A2B" indicates an original input profile, and an "original B2A" indicates an output profile.

The host device 100 accepts an operation of selecting a profile from the profiles 500 stored in the storage device 114 when the input device 116 accepts an operation on the selection fields 811 to 813.

In the input profile selection field 811, an input profile to be used for color conversion can be selected from the input profile 610 stored in the storage device 114 when the input profile 610 is used for the color conversion. When the input profile 610 is not used for the color conversion, the input profile selection field 811 may be set as a blank.

In the output profile selection field 812, an output profile to be used for the color conversion can be selected in the output profile 620 stored in the storage device 114 when the output profile 620 is used for the color conversion. When the output profile 620 is not used for the color conversion, the output profile selection field 812 may be set as a blank.

In the device link profile selection field 813, a device link profile to be used for the color conversion can be selected in the device link profile 630 stored in the storage device 114 when the device link profile 630 is used for the color conversion. When the device link profile 630 is not used for the color conversion, the device link profile selection field 813 may be set as a blank.

Figure 8A:
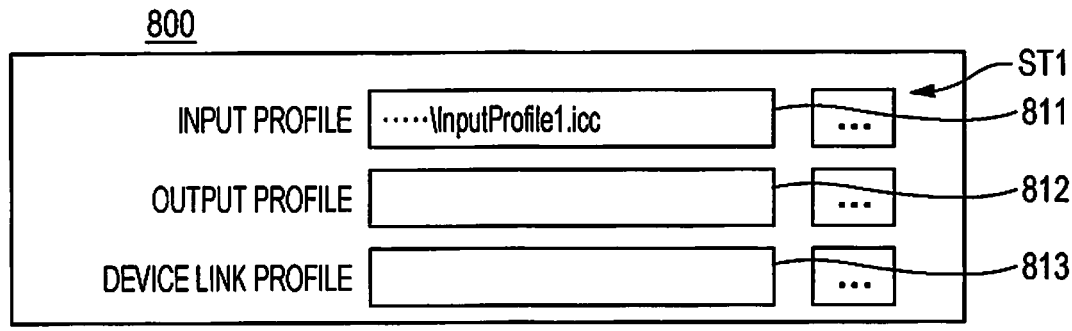
FIGS. 8A to 8D are diagrams schematically illustrating examples in which one of a profile combination and one profile is accepted.
Figure 8B:
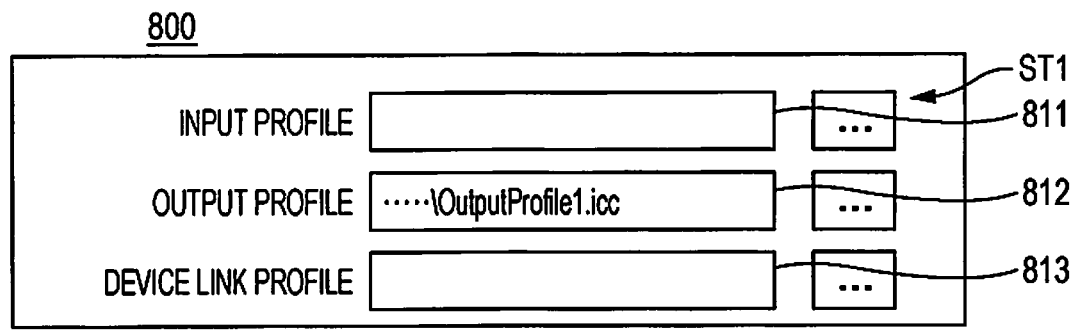
Figure 8C:
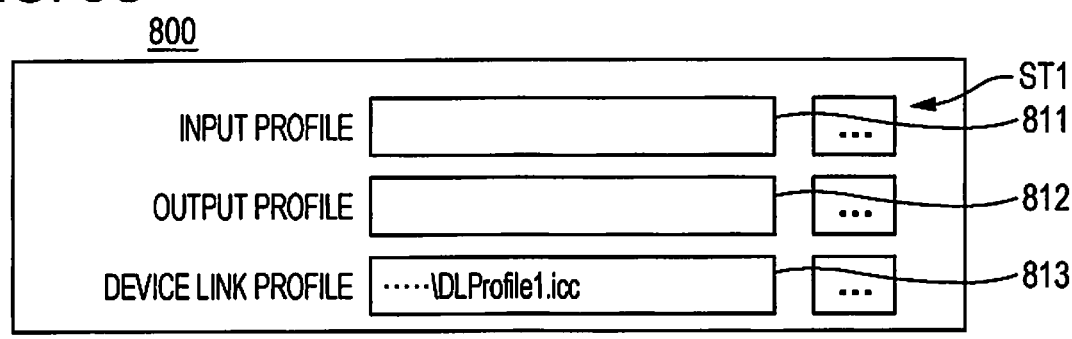

As illustrated in FIG. 8A, when the input profile 610 is selected only in the input profile selection field 811, as illustrated in FIG. 14A, only the input profile 610 is used for the color conversion and the input profile 610 automatically becomes the adjustment target profile 550. In this case, the CMYK values are applied as the first coordinate values and the Lab values are applied as the second coordinate values. As illustrated in FIG. 8B, when the output profile 620 is selected only in the output profile selection field 812, as illustrated in FIG. 14B, only the output profile 620 is used for the color conversion and the output profile 620 automatically becomes the adjustment target profile 550. In this case, the Lab values are applied as the first coordinate values and the cmyk values are applied as the second coordinate values. As illustrated in FIG. 8C, when the device link profile 630 is selected only in the device link profile selection field 813, as illustrated in FIG. 14C, the device link profile 630 is used for the color conversion and the device link profile 630 (specifically, an internal device link table) automatically becomes the adjustment target profile 550. In this case, the CMYK values are applied as the first coordinate values and the cmyk values are applied as the second coordinate values.

Figure 8D:
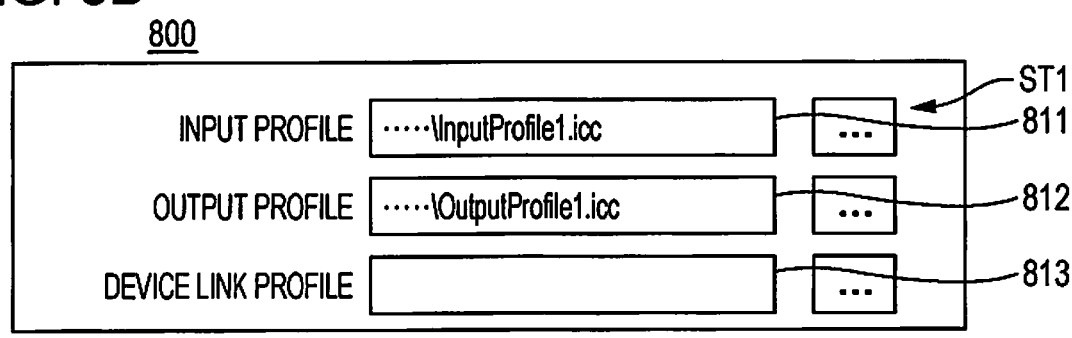

As illustrated in FIG. 8D, when the input profile 610 is selected only in the input profile selection field 811 and the output profile 620 is further selected in the output profile selection field 812, as illustrated in FIGS. 14D and 14E, the input profile 610 and the output profile 620 are combined to be used for the color conversion. In this case, the CMYK values are applied as the first coordinate values and the cmyk values are applied as the second coordinate values.

As described above, one of the combination of the profiles to be used for the color conversion and one profile which is the adjustment target profile 550 to be used for the color conversion is selected in the selection fields 811 to 813.

Next, the process of S212 will be described with reference to FIGS. 7 and 9A to 9D.

The host device 100 executes a process of changing a designated item of the adjustment target profile designation profile 820 in response to the selection in the above-described selection fields 811 to 813.

Figure 9A:
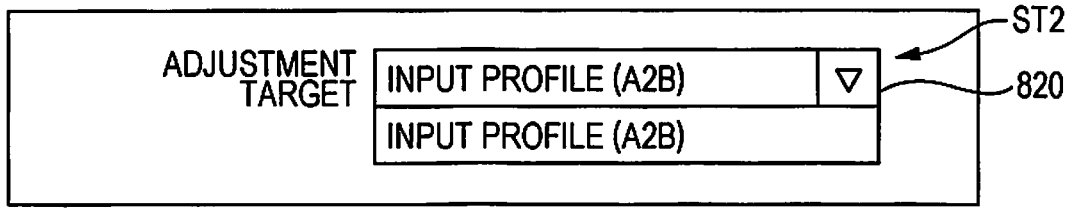
FIGS. 9A to 9D are diagrams schematically illustrating examples in which an adjustment target profile is accepted.

As illustrated in FIG. 8A, when the input profile 610 is selected only in the input profile selection field 811, as illustrated in FIG. 9A, only the input profile 610 can be designated as an adjustment target in the adjustment target profile designation field 820.

Figure 9B:
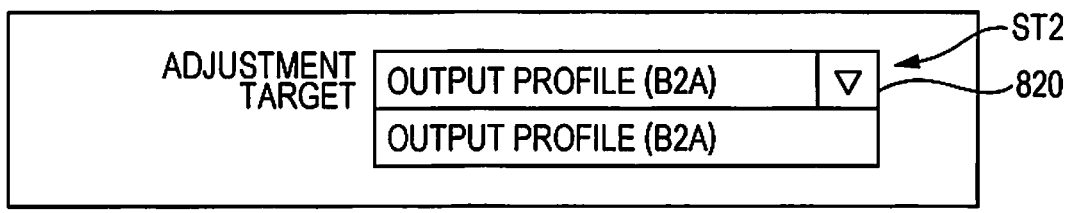

As illustrated in FIG. 8B, when the output profile 620 is selected only in the output profile selection field 812, as illustrated in FIG. 9B, only the output profile 620 can be designated as an adjustment target in the adjustment target profile designation field 820.

Figure 9C:
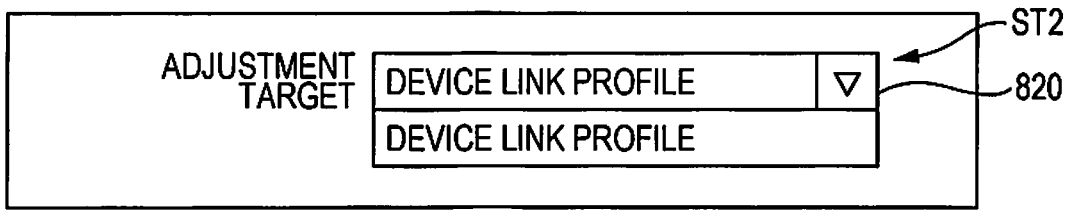

As illustrated in FIG. 8C, when the device link profile 630 is selected only in the device link profile selection field 813, as illustrated in FIG. 9C, only the device link profile 630 can be designated as an adjustment target in the adjustment target profile designation field 820.

Figure 9D:
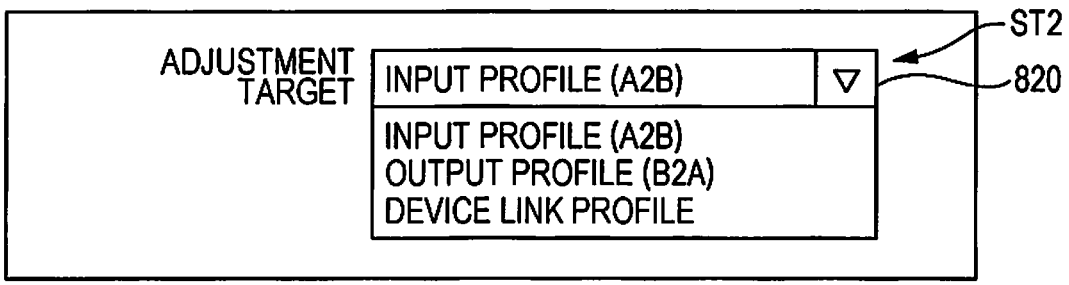

As illustrated in FIG. 8D, when the input profile 610 is selected in the input profile selection field 811 and the output profile 620 is further selected in the output profile selection field 812, as illustrated in FIG. 9D, one designation item can be selected from a plurality of designation items in the adjustment target profile designation field 820. The plurality of designation items include the input profile 610, the output profile 620, and the device link profile 630. As illustrated in FIG. 9D, the selected input profile 610 is selected. This case is equivalent to "(b-1) Designate input profile in combination of input and output profiles" illustrated in FIG. 14D. When the output profile 620 is selected in the adjustment target profile designation field 820, this case is equivalent to "(b-2) Designate output profile in combination of input and output profiles" illustrated in FIG. 14E. When the device link profile 630 is selected in the adjustment target profile designation field 820, this case is assumed to be applied to "(a-3) Select only device link profile" illustrated in FIG. 14C.

As described above, when the combination of the input profile 610 and the output profile 620 is selected, one of the profiles 610, 620, and 630 is designated as the adjustment target profile 550 in the adjustment target profile designation field 820.

In the adjustment target profile designation field 820, validation or invalidation of an operation on the above-described selection fields 811 to 813 may be controlled in response to the selection so that the input profile 610, the output profile 620, and the device link profile 630 can all be selected as the adjustment target.

Further, the process of S213 will be described with reference to FIGS. 7, 10A to 10C, and the like.

The host device 100 executes a process of changing a selection item of the adjustment target color space selection field 830 in response to selection on the above-described selection fields 811 to 813.

Figure 10A:
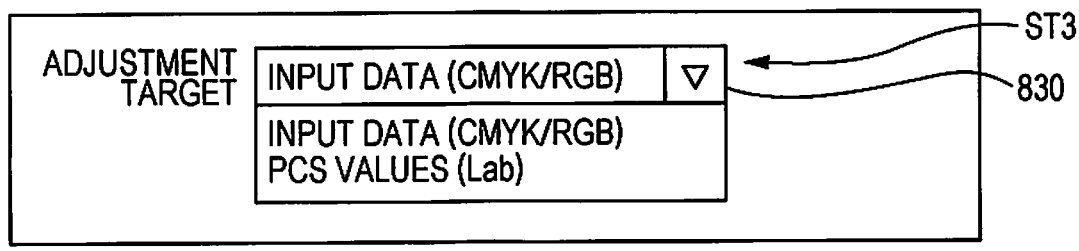
FIGS. 10A to 10C are diagrams schematically illustrating examples in which an adjustment target color space is accepted.

As illustrated in FIG. 8A, when the input profile 610 is selected only in the input profile selection field 811, as illustrated in FIG. 10A, one selection item can be designated among the plurality of selection items in the adjustment target color space selection field 830. In this case, the plurality of selection items include "input data" and "PCS values". The "input data" is an item in which the CMYK color space (which is an example of the first color space CS1 and the input color space CS4) is selected as the adjustment target color space CS6 (see FIG. 16A). The "PCS values" is an item in which the Lab color space (which is an example of the third color space CS3 and the output color space CS5) is selected as the adjustment target color space CS6 (see FIG. 16B).

Figure 10B:
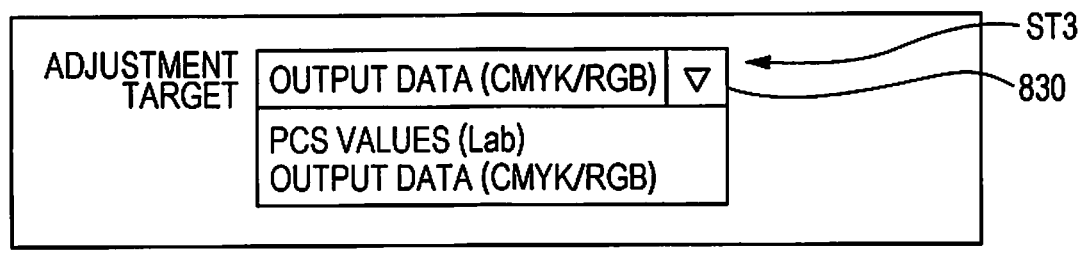

As illustrated in FIG. 8B, when the output profile 620 is selected only in the output profile selection field 812, as illustrated in FIG. 10B, one selection item can be designated among the plurality of selection items in the adjustment target color space selection field 830. In this case, the plurality of selection items include "PCS values" and "output data". The "PCS values" is an item in which the Lab color space (which is an example of the third color space CS3 and the input color space CS4) is selected as the adjustment target color space CS6 (see FIG. 16C). The "output data" is an item in which the cmyk color space (which is an example of the second color space CS2 and the output color space CS5) is selected as the adjustment target color space CS6 (see FIG. 16D).

Figure 10C:
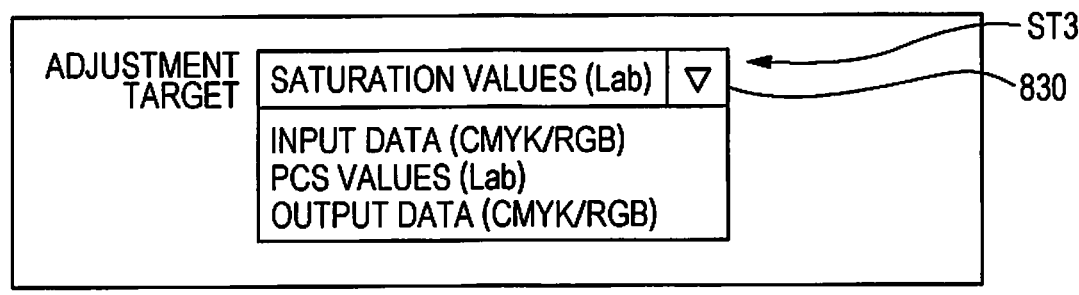

As illustrated in FIG. 8D, when the input profile 610 is selected in the input profile selection field 811 and the output profile 620 is further selected in the output profile selection field 812, as illustrated in FIG. 10C, one selection item can be designated among the plurality of selection items in the adjustment target color space selection field 830. In this case, the plurality of selection items include: input data", "output data", and "PCS values". The "input data" is an item in which the CMYK color space (which is an example of the first color space CS1 and the input color space CS4 in the input profile 610) is selected as the adjustment target color space CS6 (see FIG. 17A). The "output data" is an item in which the cmyk color space (which is an example of the second color space CS2 and the output color space CS5 in the output profile 620) is selected as the adjustment target color space CS6 (see FIG. 17B). The "PCS values" is an item in which the Lab color space (which is the third color space CS3, an example of the output color space CS5 in the input profile 610, and the input color space CS4 in the output profile 620) is selected as the adjustment target color space CS6 (see FIG. 17C).

As illustrated in FIG. 8C, when the device link profile 630 is selected only in the device link profile selection field 813, as illustrated in FIG. 10C, one can be designated from "input data", "output data", and "PCS values" in the adjustment target color space selection field 830.

As described above, one color space of two or more kinds of color spaces among the CMYK color space (CS1), the cmyk color space (CS2), and the Lab color space (CS3) is selected as the adjustment target color space CS6.

Further, the process of S214 will be described with reference to FIGS. 7, 11A, 11B, and the like.

The host device 100 executes a process of changing an input item of the target acceptance region 840 in response to selection in the above-described fields 811 to 813 and 830. The host device 100 executes a process of changing an input item of the target acceptance region 840 in response to selection in the adjustment data selection field 845.

Figure 11A:
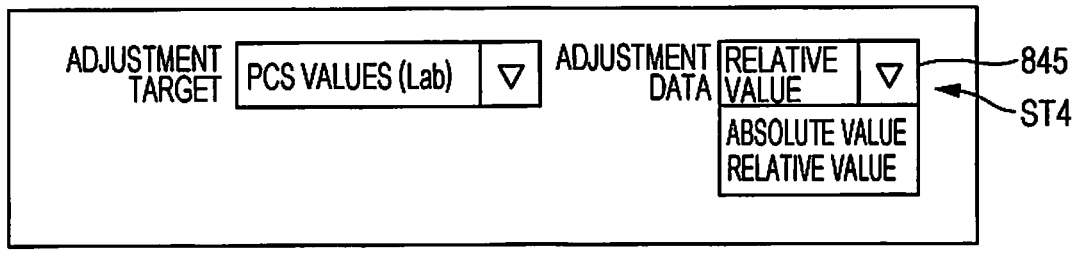
FIG. 11A is a diagram schematically illustrating an example in which an adjustment target inputting method is accepted.

As illustrated in FIG. 11A, one of "absolute value" and "relative value" can be selected in the adjustment data selection field 845. The "absolute value" is an option for accepting the adjustment target T0 as the coordinate values of a color space. The "relative value" is an option for accepting the adjustment target T0 as a difference from the current coordinate values of the color space.

Figure 11B:
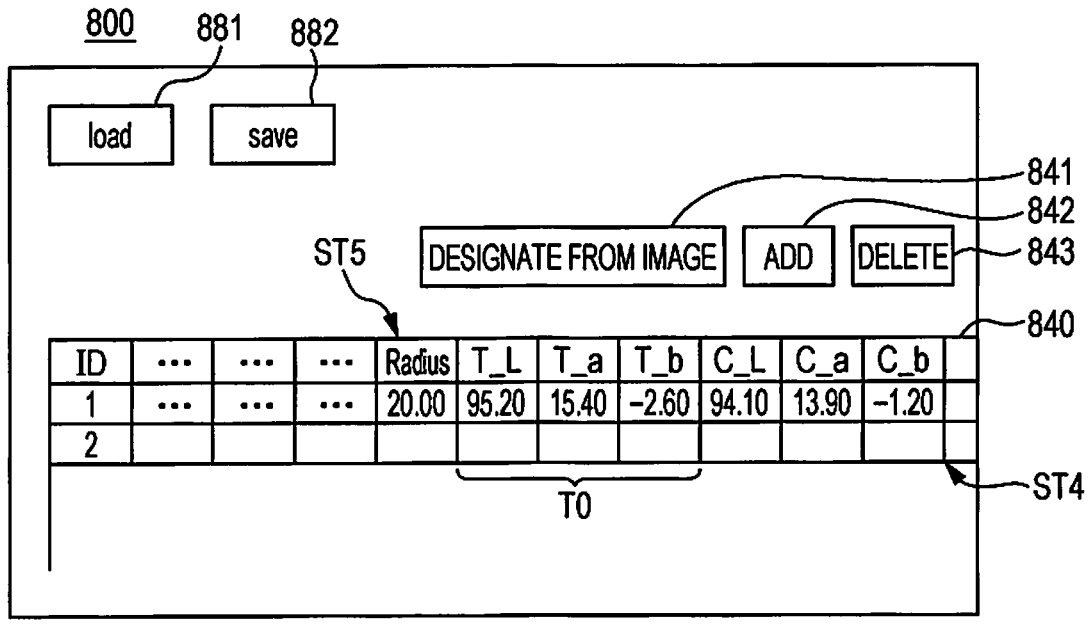
FIG. 11B is a diagram schematically illustrating an example of a UI screen when an adjustment target is accepted as coordinate values of a color space.

When the "absolute value" is selected in the adjustment data selection field 845, as illustrated in FIG. 11B, an input field of coordinate values (T_L, T_a, T_b) of the adjustment target T0 is displayed along with a display field of the current coordinate values (C_L, C_a, C_b) of the color space in the target acceptance region 840. FIG. 11B illustrates an example of a case in which the Lab color space is selected as the adjustment target color space CS6.

When the "relative value" is selected in the adjustment data selection field 845, as illustrated in FIG. 7, an input field of coordinate values (ΔL, Δa, Δb) of the adjustment target T0 which are a difference from the current coordinate values of the color space is displayed in the target acceptance region 840. FIG. 7 illustrates an example of a case in which the Lab color space is selected as the adjustment target color space CS6.

Figure 11C:
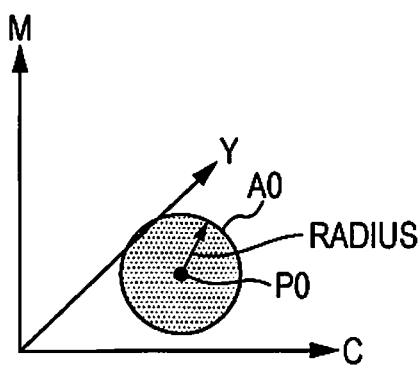
FIG. 11C is a diagram schematically illustrating an example in which an adjustment point is set.
Figure 12:
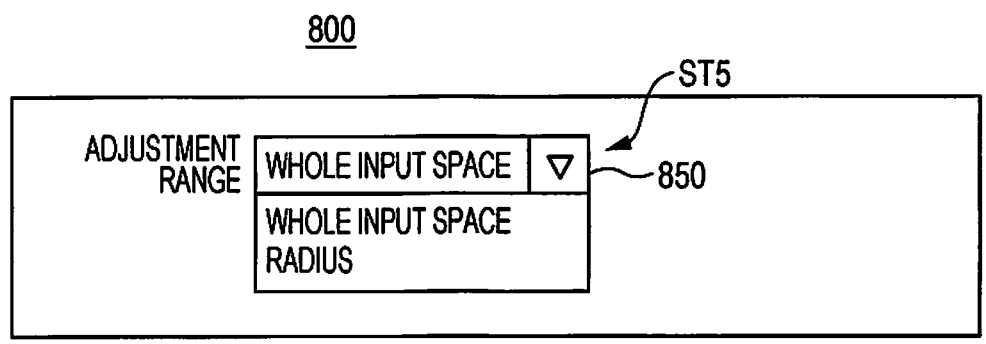
FIG. 12 is a diagram schematically illustrating an example in which whether an adjustment range adjusted based on a target is the whole color space is accepted.

As illustrated in FIG. 11C, the adjustment point P0 for setting the adjustment target T0 is set in the CMYK color space (CS1). Here, since the CMYK color space is a 4-dimensional color space, a 3-dimensional virtual space formed by C, M, and Y axes is illustrated in FIG. 11C.

For example, when an operation on the button 841 of "designate from image" on the UI screen 800 illustrated in FIGS. 7 and 11B is accepted, the host device 100 displays a screen for schematically showing the CMYK color space (CS1) on the display device 115, acquires the CMYK values in response to an operation by the input device 116, and updates information regarding the target acceptance region 840. When the new adjustment point P0 is designated, the host device 100 grants a corresponding ID (identification information) and displays the acquired CMYK values and the coordinate values of the output color space CS5 requested from the CMYK values in correspondence to the ID in the target acceptance region 840. When the addition button 842 is operated, the host device 100 adds the ID to increase an input field corresponding to the added ID in the target acceptance region 840. When the deletion button 843 is operated, the host device 100 accepts designation of the ID to be deleted and deletes the input field corresponding to the ID designated.

When an operation on the history load button 881 is accepted, the host device 100 reads the adjustment history 700 of the adjustment stored in the storage device 114 and adds the adjustment history 700 in the target acceptance region 840. When an operation on the history save button 882 is accepted, the host device 100 stores information regarding the target acceptance region 840 as the adjustment history 700 in the storage device 114.

The adjustment target T0 accepted in the target acceptance region 840 is changed as follows depending on selected content of the adjustment target color space selection field 830 and selected content of the adjustment data selection field 845.

(Selected Content 1) The CMYK color space is selected as the adjustment target color space CS6 and the "absolute value" is selected as an input of the adjustment target T0. In this case, the input of the adjustment target T0 is the CMYK values (which are assumed to be T_C, T_M, T_Y, T_K). The CMYK values are expressed in, for example, 0 to 100%.

(Selected Content 2) The CMYK color space is selected as the adjustment target color space CS6 and the "relative value" is selected as an input of the adjustment target T0. In this case, the input of the adjustment target T0 is differences (which are assumed to be ΔC, ΔM, ΔY, ΔK) of the target values (T_C, T_M, T_Y, T_K) of the current values (C_C, C_M, C_Y, C_K) of the CMYK values.

(Selected Content 3) The Lab color space is selected as the adjustment target color space CS6 and the "absolute value" is selected as an input of the adjustment target T0. In this case, the input of the adjustment target T0 is the Lab values (which are assumed to be T_L, T_a, T_b).

(Selected Content 4) The Lab color space is selected as the adjustment target color space CS6 and the "relative value" is selected as an input of the adjustment target T0. In this case, the input of the adjustment target T0 is differences (which are assumed to be ΔL, Δa, and Δb) of the target values (T_L, T_a, T_b) of the current values (C_L, C_a, C_b) of the Lab values.

(Selected Content 5) The cmyk color space is selected as the adjustment target color space CS6 and the "absolute value" is selected as an input of the adjustment target T0. In this case, the input of the adjustment target T0 is the cmyk values (which are assumed to be T_c, T_m, T_y, T_k). The cmyk values are expressed in, for example, 0 to 100%.

(Selected Content 6) The cmyk color space is selected as the adjustment target color space CS6 and the "relative value" is selected as an input of the adjustment target T0. In this case, the input of the adjustment target T0 is differences (which are assumed to be Δc, Δm, Δy, Δk) of the target values (T_c, T_m, T_y, T_k) of the current values (C_c, C_m, C_y, C_k) of the cmyk values.

As described above, the adjustment target T0 is accepted at the coordinates indicating the adjustment point P0 in the adjustment target color space CS6.

Further, the process of S215 will be described with reference to FIG. 7, 12, and the like.

The host device 100 accepts designation of whether the adjustment range A0 adjusted based on the adjustment target T0 is the whole color space in the adjustment range designation field 850. A plurality of designation items of the adjustment range designation field 850 illustrated in FIG. 12 include "whole input space" and "radius". When the "whole input space" is designated, the adjustment range A0 is set to the whole color space. When the "radius" is designated, the host device 100 accepts an input of a radius set using the adjustment point P0 as a base point in the input field of "Radius" of the target acceptance region 840, as illustrated in FIG. 11B. This radius is expressed in, for example, 0 to 100% of the relative value of a Euclid distance in the first color space CS1. FIG. 11C schematically illustrates an example of the adjustment range A0 when the radius (Radius) is designated.

As described above, the adjustment range A0 is set in the adjustment target profile 550 in the first color space CS1.

Further, the process of S216 will be described with reference to FIG. 7, 13, and the like.

Figure 13:
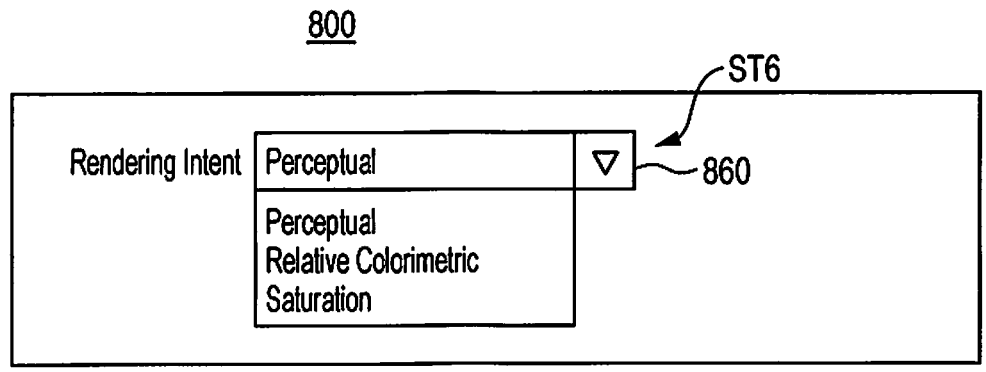
FIG. 13 is a diagram schematically illustrating an example in which a rendering intent is accepted.

The host device 100 accepts designation of a rendering intent for defining a correspondent relation of the adjustment target profile 550 in the intent designation field 860. A plurality of designation items of the intent designation field 860 illustrated in FIG. 13 are three kinds of items, "Perceptual", and "Relative Colorimetric", and "Saturation". Of course, the designation items may include "Absolute Colorimetric", and some of "Perceptual", "Relative Colorimetric", and "Saturation" may not be included in the designation items. FIG. 13 illustrates an example in which "Perceptual" is designated as the designation intent.

As described above, one of the plurality of rendering intents for defining the correspondent relation of the adjustment target profile 550 is accepted as a designation intent.

When the operation on the adjustment execution button 870 illustrated in FIG. 7 is accepted, the host device 100 ends the process of S210 in FIG. 6 and executes a process subsequent to S104 of FIG. 5. Here, when "Perceptual" is designated in the intent designation field 860, the host device 100 uses information appropriate for the A2B0 and B2A0 tags illustrated in FIG. 4 in the profile 500 in the process subsequent to S104. When "Relative Colorimetric" is designated in the intent designation field 860, the host device 100 uses information appropriate for the A2B1 and B2A1 tags illustrated in FIG. 4 in the profile 500 in the process subsequent to S104. When "Saturation" is designated in the intent designation field 860, the host device 100 uses information appropriate for the A2B2 and B2A2 tags illustrated in FIG. 4 in the profile 500 in the process subsequent to S104.

First, the host device 100 obtains current output values CurrentOut according to the color conversion profile (including a combination of the profiles) designated in the profile selection fields 811 to 813 at each adjustment point P0 input in the target acceptance region 840 (S104). This is because the adjustment is executed using the output colors $cmyk_p$ corresponding to the colors of the output image IMO formed on the print substrate ME1 as a reference. When there is information appropriate for the designation intent in the profile, the color conversion is executed according to the information appropriate for the designation intent.

For example, as illustrated in FIG. 14A, when only the input profile 610 is designated for the color conversion (a-1), the input values Input of each adjustment point P0 are CMYK values (which are assumed to be Cp, Mp, Yp, Kp). In this case, the current output values CurrentOut are Lab values (which are assumed to be Lp, ap, bp). Here, the variable p is a variable for identifying the adjustment point P0.

Here, as illustrated in FIG. 15, conversion according to a profile (for example, an ICC profile) is assumed to be indicated by $f_{icc}$ (first, second, and third arguments). Here, the first argument indicates a profile to be used. In the first argument, InputProfile indicates an input profile and OutputProfile indicates an output profile. DLProfile indicates a device link profile. In the second argument, A2B0 indicates conversion from device colors to device-independent colors and B2A indicates conversion from device-independent colors to device colors. In the third argument, Input indicates input values (CMYK, RGB, Lab, or the like) of the adjustment point P0.

In the foregoing (a-1) case, the adjustment target profile 550 automatically becomes the input profile 610 and the current output values CurrentOut can be calculated by the following expression (see FIG. 15):

$$\text{CurrentOut} = f_{icc}(\text{InputProfile}, A2B, \text{Input}).$$

As illustrated in FIG. 14B, when only the output profile 620 is designated for the color conversion (a-2), the input values at each adjustment point P0 are Lab values (which are assumed to be Lp, ap, bp). In this case, the current output values CurrentOut are cmyk values (where are assumed to be cp, mp, yp, kp).

In the foregoing (a-2) case, the adjustment target profile 550 automatically becomes the output profile 620 and the current output values CurrentOut can be calculated by the following expression (see FIG. 15):

$$\text{CurrentOut} = f_{icc}(\text{OutputProfile}, B2A, \text{Input}).$$

As illustrated in FIG. 14C, when the device link profile 630 is designated for the color conversion (a-3), the input values Input at each adjustment point P0 are the CMYK values (Cp, Mp, Yp, Kp). In this case, the current output values CurrentOut are cmyk values (cp, mp, yp, kp).

In the foregoing (a-3) case, the adjustment target profile 550 automatically becomes the device link profile 630 and the current output values CurrentOut can be calculated by the following expression (see FIG. 15):

$$CurrentOut = f_{icc}(DLProfile, A2B0, Input).$$

As illustrated in FIGS. 14D and 14E, when the combination of the profiles 610 and 620 is designated for the color conversion (b-1) and (b-2), the input values Input at each adjustment point P0 are the CMYK values (Cp, Mp, Yp, Kp). In this case, the current output values CurrentOut are cmyk values (cp, mp, yp, kp).

In the foregoing (b-1) and (b-2) cases, when the adjustment target profile 550 is the input profile 610 or the output profile 620, the current output values CurrentOut can be calculated by the following expression (see FIG. 15):

$$CurrentOut = f_{icc}(OutputProfile, B2A, f_{icc}(InputProfile, A2B, Input)).$$

After the current output values CurrentOut are calculated, the host device 100 obtains the target output values TargetOut according to the color conversion profile (including the combination of the profiles) designated in the profile selection fields 811 to 813 and the adjustment target color space CS6 designated in the adjustment target color space selection field 830 at each adjustment point P0 input in the target acceptance region 840 (S106). This is because the adjustment is executed using the output colors $cmyk_p$ corresponding to the colors of the output image IMO formed on the print substrate ME1 as a reference. When there is the information appropriate for the designation intent in the profile, the color conversion is executed according to the information in accordance with the designation intent.

For example, as illustrated in FIG. 16A, when only the input profile 610 is designated for the color conversion and the input color space CS4 is designated in the adjustment target color space CS6 (a-1-1), the adjustment amounts AdjustData are added to the CMYK values (Cp, Mp, Yp, Kp) in the CMYK color space. The adjustment amounts AdjustData are expressed with relative values ($\Delta$Cp, $\Delta$Mp, $\Delta$Yp, $\Delta$Kp). In the CMYK color space, the CMYK values after the adjustment are expressed as (Cp+$\Delta$Cp, Mp+$\Delta$Mp, Yp+$\Delta$Yp, Kp+$\Delta$Kp).

In the foregoing (a-1-1) case, the target output values TargetOut can be calculated by the following expression (see FIG. 18):

$$TargetOut = f_{icc}(InputProfile, A2B, Input+AdjustData).$$

As illustrated in FIG. 16B, when only the input profile 610 is designated for the color conversion and the output color space CS5 is designated in the adjustment target color space CS6 (a-1-2), the adjustment amounts AdjustData are added to the Lab values (Lp, ap, bp) in the Lab color space. The adjustment amounts AdjustData are expressed with relative values (which are assumed to be $\Delta$Lp, $\Delta$ap, $\Delta$bp). In the Lab color space, the Lab values after the adjustment are expressed as (Lp+$\Delta$Lp, ap+$\Delta$ap, bp+$\Delta$bp).

In the foregoing (a-1-2) case, the target output values TargetOut can be calculated by the following expression (see FIG. 18):

$$TargetOut = f_{icc}(InputProfile, A2B, Input)+AdjustData.$$

As illustrated in FIG. 16C, when only the output profile 620 is designated for the color conversion and the input color space CS4 is designated in the adjustment target color space CS6 (a-2-1), the adjustment amounts AdjustData are added to the Lab values (Lp, ap, bp) in the Lab color space. The adjustment amounts AdjustData are expressed with relative values ($\Delta$Lp, $\Delta$ap, $\Delta$bp). In the Lab color space, the Lab values after the adjustment are expressed as (Lp+$\Delta$Lp, ap+$\Delta$ap, bp+$\Delta$bp).

In the foregoing (a-2-1) case, the target output values TargetOut can be calculated by the following expression (see FIG. 18):

$$TargetOut = f_{icc}(OutputProfile, B2A, Input+AdjustData).$$

As illustrated in FIG. 16D, when only the output profile 620 is designated for the color conversion and the output color space CS5 is designated in the adjustment target color space CS6 (a-2-2), the adjustment amounts AdjustData are added to the cmyk values (cp, mp, yp, kp) in the cmyk color space. The adjustment amounts AdjustData are expressed with relative values (which are assumed to be $\Delta$cp, $\Delta$mp, $\Delta$yp, $\Delta$kp). In the cmyk color space, the cmyk values after the adjustment are expressed as (cp+$\Delta$cp, mp+$\Delta$mp, yp+$\Delta$yp, kp+$\Delta$kp).

In the foregoing (a-2-2) case, the target output values TargetOut can be calculated by the following expression (see FIG. 18):

$$TargetOut = f_{icc}(OutputProfile, B2A, Input)+AdjustData.$$

When the device link profile 630 is designated for the color conversion and the input color space CS4 is designated in the adjustment target color space CS6 (a-3-1), the adjustment amounts AdjustData is added to the CMYK values (Cp, Mp, Yp, Kp) in the CMYK color space. The adjustment amounts AdjustData are expressed with relative values ($\Delta$Cp, $\Delta$Mp, $\Delta$Yp, $\Delta$Kp). In the CMYK color space, the CMYK values after the adjustment are expressed as (Cp+$\Delta$Cp, Mp+$\Delta$Mp, Yp+$\Delta$Yp, Kp+$\Delta$Kp).

In the foregoing (a-3-1) case, the target output values TargetOut can be calculated by the following expression (see FIG. 18):

$$TargetOut = f_{icc}(DLProfile, A2B0, Input+AdjustData).$$

When the device link profile 630 is designated for the color conversion and the output color space CS5 is designated in the adjustment target color space CS6 (a-3-2), the adjustment amounts AdjustData are added to the cmyk values (cp, mp, yp, kp) in the cmyk color space. The adjustment amounts AdjustData are expressed with relative values ($\Delta$cp, $\Delta$mp, $\Delta$yp, $\Delta$kp). In the cmyk color space, the cmyk values after the adjustment are expressed as (cp+$\Delta$cp, mp+$\Delta$mp, yp+$\Delta$yp, kp+$\Delta$kp).

In the foregoing (a-3-2) case, the target output values TargetOut can be calculated by the following expression (see FIG. 18):

$$TargetOut = f_{icc}(DLProfile, A2B0, Input)+AdjustData.$$

Although not illustrated, the Lab colors space may also be assumed to be designated in the adjustment target color space CS6. In this case, the Lab color space is the output color space CS5 in the input profile 610 and is the input color space CS4 in the output profile 620. The target output values TargetOut can be calculated, for example, by referring to the output profile used to generate the device link profile 630.

As illustrated in FIG. 17A, when a combination of the profiles 610 and 620 is designated for the color conversion and the input color space CS4 of the input profile 610 is designated in the adjustment target color space CS6 (b-1-1), the adjustment amounts AdjustData are added to the CMYK values (Cp, Mp, Yp, Kp) in the CMYK color space. The adjustment amounts AdjustData are expressed with relative values (ΔCp, ΔMp, ΔYp, ΔKp). In the CMYK color space, the CMYK values after the adjustment are expressed as (Cp+ΔCp, Mp+ΔMp, Yp+ΔYp, Kp+ΔKp).

In the foregoing (b-1-1) case, the target output values TargetOut can be calculated by the following expression (see FIG. 18):

TargetOut=$f_{icc}$(OutputProfile,B2A,$f_{icc}$(InputProfile, A2B,Input+AdjustData)).

The foregoing expression is the same even when the adjustment target profile 550 is the output profile 620.

As illustrated in FIG. 17B, when the combination of the profiles 610 and 620 is designated for the color conversion and the output color space CS5 of the output profile 620 is designated for the adjustment target color space CS6 (b-1-2), the adjustment amounts AdjustData are added to the cmyk values (cp, mp, yp, kp) in the cmyk color space. The adjustment amounts AdjustData are expressed with relative values (Δcp, Δmp, Δyp, Δkp). In the cmyk color space, the cmyk values after the adjustment are expressed as (cp+Δcp, mp+Δmp, yp+Δyp, kp+Δkp).

In the foregoing (b-1-2) case, the target output values TargetOut can be calculated by the following expression (see FIG. 18):

TargetOut=$f_{icc}$(OutputProfile,B2A,$f_{icc}$(InputProfile, A2B,Input))+AdjustData.

The foregoing expression is the same even when the adjustment target profile 550 is the output profile 620.

As illustrated in FIG. 17C, when the combination of the profiles 610 and 620 is designated for the color conversion and PCS (the output color space CS5 in the input profile 610 and the input color space CS4 in the output profile 620) is designated in the adjustment target color space CS6 (b-1-3), the adjustment amounts AdjustData are added to the Lab values (Lp, ap, bp) in the Lab color space. The adjustment amounts AdjustData are expressed with relative values (ΔLp, Δap, Δbp). In the Lab color space, the Lab values after the adjustment are expressed as (Lp+ΔLp, ap+Δap, bp+Δbp).

In the foregoing (b-1-3) case, the target output values TargetOut can be calculated by the following expression (see FIG. 18):

TargetOut=$f_{icc}$(OutputProfile,B2A,$f_{icc}$(InputProfile, A2B,Input)+AdjustData).

The foregoing expression is the same even when the adjustment target profile 550 is the output profile 620.

The calculation of the target output values TargetOut can be omitted when the adjustment target T0 is expressed with the output coordinate values. The calculation of the target output values TargetOut can be executed when the adjustment target T0 is not expressed with the output coordinate values.

After the target output values TargetOut are calculated, the host device 100 acquires the input values Input_P and the adjustment target values TargetOut_P at each adjustment point P0 in the adjustment target profile 550 (S108). This is because the correspondent relation between the input values and the output values in the adjustment target profile 550 is adjusted. When there is information regarding the designation intent in the profile, the color conversion is executed according to the information appropriate for the designation intent.

In the (a-1), (a-2), and (a-3) cases illustrated in FIGS. 14A, 14B, and 14C, that is, when one profile (one of the profiles 610, 620, and 630) is designated for the color conversion, the designated profile is the adjustment target profile 550. Accordingly, the input values Input of the designated profile are used as the input values Input_P in the adjustment target profile 550, and the target output values TargetOut of the designated profile are used as the adjustment target values TargetOut_P in the adjustment target profile 550. The expressions are as follows (see FIG. 20):

Input_P=Input; and

TargetOut_P=TargetOut.

The current output values CurrentOut_P in the adjustment target profile 550 are the current output values CurrentOut of the designated profile:

CurrentOut_P=CurrentOut

When the relative value of the adjustment target T0 is expressed in the output color space CS5 of the adjustment target profile 550, TargetOut_P−CurrentOut_P is set.

As illustrated in FIG. 19A, in the case (b-1) illustrated in FIG. 14D, that is, when the combination of the profiles 610 and 620 is selected for the color conversion and the input profile 610 is designated in the adjustment target profile 550, the input values Input of the combination of the profiles 610 and 620 are used as the input values Input_P in the adjustment target profile 550. The adjustment target values TargetOut_P (the Lab values) of the adjustment target profile 550 can be calculated from the target output values TargetOut which are the cmyk values (see FIG. 20):

Input_P=Input; and

TargetOut_P=$f_{icc}$(OutputProfile,A2B,TargetOut).

The reason why the adjustment target values TargetOut_P (the Lab values) of the adjustment target profile 550 are obtained from the target output values TargetOut (the cmyk values) is to execute the adjustment using the output colors cmyk$_p$ corresponding to the colors of the output image IMO as a reference.

The current output values CurrentOut_P (the Lab values) in the adjustment target profile 550 are expressed in the following expression:

CurrentOut_P=$f_{icc}$(InputProfile,A2B,Input).

The relative values of the adjustment target T0 are expressed in the output color space CS5 of the adjustment target profile 550, TargetOut_P−CurrentOut_P is set.

As illustrated in FIG. 19B, in the (b-2) case illustrated in FIG. 14E, that is, when the combination of the profiles 610 and 620 is selected for the color conversion and the output profile 620 is designated in the adjustment target profile 550, the target output values TargetOut of the combination of the profiles 610 and 620 are used as the adjustment target values TargetOut_P in the adjustment target profile 550. The input values Input_P (the Lab values) of the adjustment target profile 550 can be calculated from the input values Input (the CMYK values) which are the CMYK values (see FIG. 20):

Input_P=$f_{icc}$(InputProfile,A2B,Input); and
TargetOut_P=TargetOut.

The current output values CurrentOut_P (the cmyk values) in the adjustment target profile 550 are the current output values CurrentOut of the combination of the profiles 610 and 620:

CurrentOut_P=CurrentOut.

When the relative values of the adjustment target T0 are expressed in the output color space CS5 of the adjustment target profile 550, TargetOut_P−CurrentOut_P is set.

After the input values Input_P in the adjustment target profile 550 and the adjustment target values TargetOut_P are acquired, the host device 100 adjusts the adjustment range A0 of the adjustment target profile 550 based on the adjustment target T0 in S110 to S112.

First, the concept that the adjustment target profile 550 is adjusted in the adjustment range A0 will be described with reference to FIGS. 21A and 21B. Here, in FIGS. 21A and 21B, the horizontal axis represents input values along a certain coordinate axis of the input color space CS4 and the vertical axis represents output values along a certain coordinate axis of the output color space CS5. For example, when the input color space CS4 is the CMYK color space, the horizontal axis is the C, M, Y, or K axis. When the output color space CS5 is the Lab color space, the vertical axis is the L, a, or b axis. A white circle on the horizontal axis indicates the lattice point GD0.

Figure 21A:
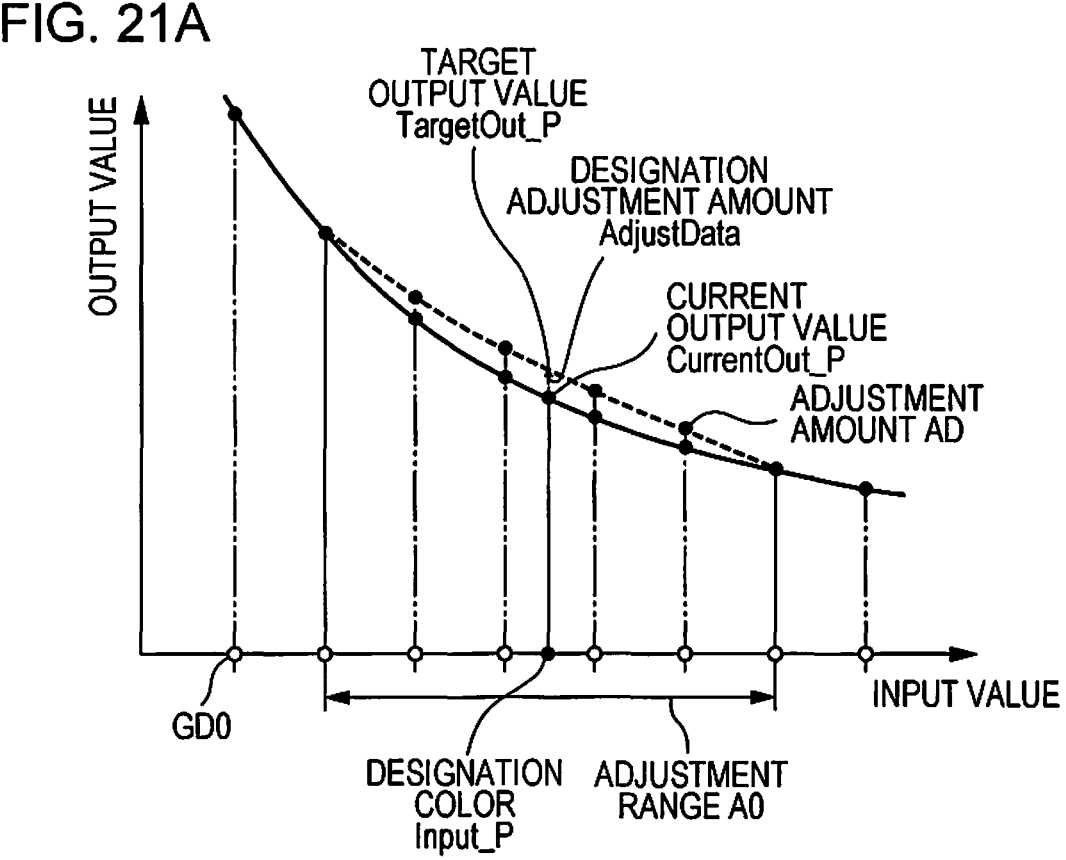
FIG. 21A is a diagram schematically illustrating adjustment amounts of each lattice point when adjustment is executed in an output color space of an adjustment target profile.

FIG. 21A schematically exemplifies the adjustment amounts AD of each lattice point GD0 when the output values are adjusted. The adjustment point P0 designated by the user corresponds to the input values Input_P. When the user gives an instruction of the adjustment amounts AdjustData as the adjustment target T0, the adjustment target values TargetOut_P obtained by adding the adjustment amounts AdjustData to the current output values CurrentOut_P corresponding to the input values Input_P are set. Of course, when the adjustment target color space CS6 is the cmyk color space, the current output values CurrentOut_P and the adjustment target values TargetOut_P are expressed with the cmyk values, and the adjustment amounts AdjustData are expressed with the relative values (Δcp, Δmp, Δyp, Δkp) of the cmyk values. When the adjustment target color space CS6 is the Lab color space, the current output values CurrentOut_P and the adjustment target values TargetOut_P are expressed with the Lab values, and the adjustment amounts AdjustData are expressed with the relative values (ΔLp, Δap, Δbp) of the Lab values.

The adjustment range A0 is set in the adjustment amounts AdjustData through an input to the adjustment range designation field 850 and the target acceptance region 840 illustrated in FIG. 7. When "radius" is designated in the adjustment range designation field 850, basically, the adjustment amounts of the output values with respect to the input values Input_P are set to the maximum and the adjustments at the boundary of the adjustment range A0 is set to 0. Here, since the actual adjustment is executed on the lattice points GD0 of the adjustment target profile 550, the adjustment is affected up to a range broader than the set adjustment range A0 in some cases.

Figure 21B:
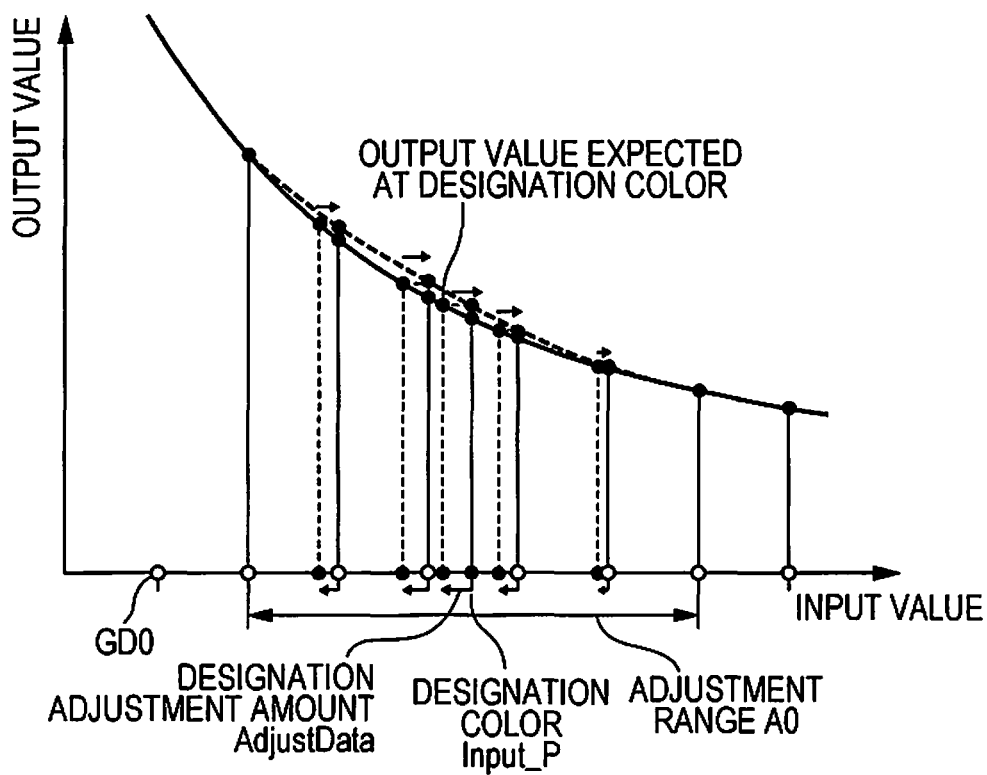
FIG. 21B is a diagram schematically illustrating adjustment amounts of each lattice point when adjustment is executed in an input color space of an adjustment target profile.

FIG. 21B schematically exemplifies the adjustment amounts AD of each lattice point GD0 when the input values are adjusted. The adjustment point P0 designated by the user corresponds to the input values Input_P. When the user gives an instruction of the adjustment amounts AdjustData as the adjustment target T0, the output values corresponding to the input values Input_P+AdjustData obtained by adding the adjustment amounts AdjustData to the input values Input_P are output values expected at the adjustment point P0 designated by the user. Of course, when the adjustment target color space CS6 is the CMYK color space, the input values Input_P are expressed with the CMYK values and the adjustment amounts AdjustData are expressed with the relative values (ΔCp, ΔMp, ΔYp, ΔKp) of the CMYK values. When the adjustment target color space CS6 is the Lab color space, the input values Input_P are expressed with the Lab values, and the adjustment amounts AdjustData are expressed with the relative values (ΔLp, Δap, Δbp) of the Lab values.

The above-described correction is executed on all the coordinate axes of the input color space CS4 and all the coordinate values of the output color space CS5.

Next, an example in which the adjustment amounts AD is set at each lattice point GD0 of the adjustment range A0 will be described with reference to FIGS. 22A and 22B. Here, in FIGS. 22A and 22B, the horizontal axis represents input values and the vertical axis represents the adjustment amounts AD of the output values. A triangle on the horizontal axis indicates the lattice point (excluding a nearest lattice point GDnearest) within the adjustment range A0 and a rectangle on the horizontal axis indicates the lattice point at which the output values outside of the adjustment range A0 are not corrected.

Figure 22A:
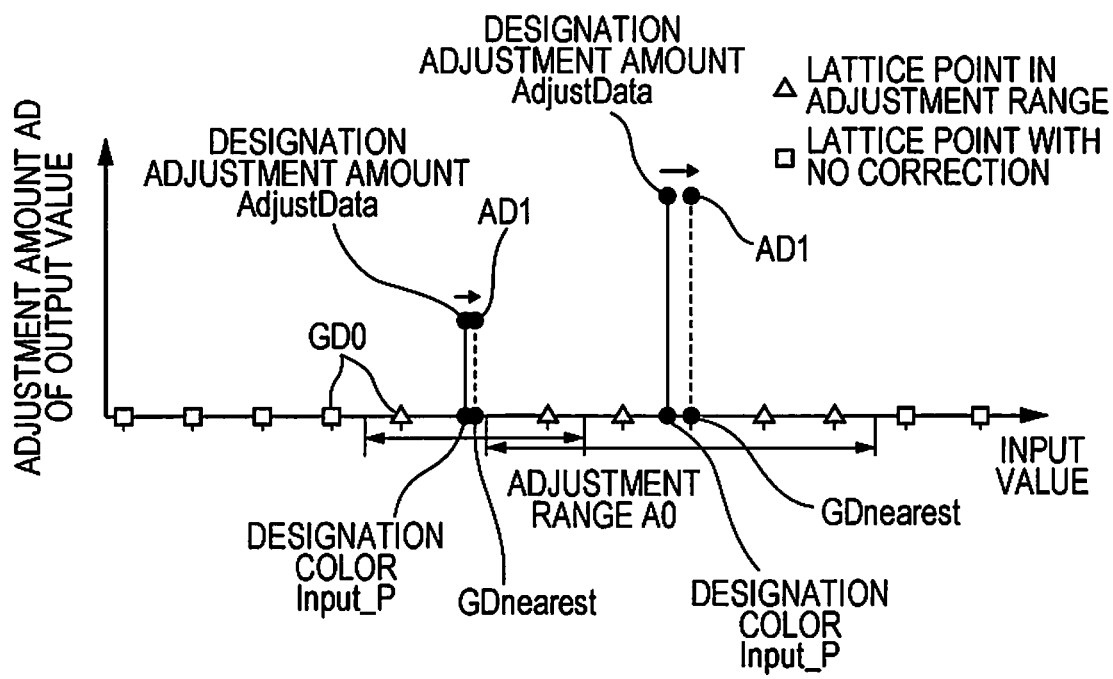
FIG. 22A is a diagram schematically illustrating an example in which adjustment amounts of output values at a nearest lattice point are determined.

As illustrated in FIG. 22A, the host device 100 determines the adjustment amounts AD1 of the output values for the nearest lattice point GDnearest which is a lattice point closest to the adjustment point P0 at each adjustment point P0 (S110 of FIG. 5). FIG. 22A illustrates an example in which the adjustment amounts AD1 of the output values are determined when there are four adjustment points P0 (the input values Input_P) on a certain coordinate axis of the input color space CS4. In the example of FIG. 22A, the adjustment amounts AdjustData for the input value Input_P are set as the adjustment amounts AD1 of the output values for the nearest lattice point GDnearest without change. Of course, the technology is no limited to the adjustment amounts AdjustData set as the adjustment amounts AD1 of the output values for the nearest lattice point GDnearest.

Figure 22B:
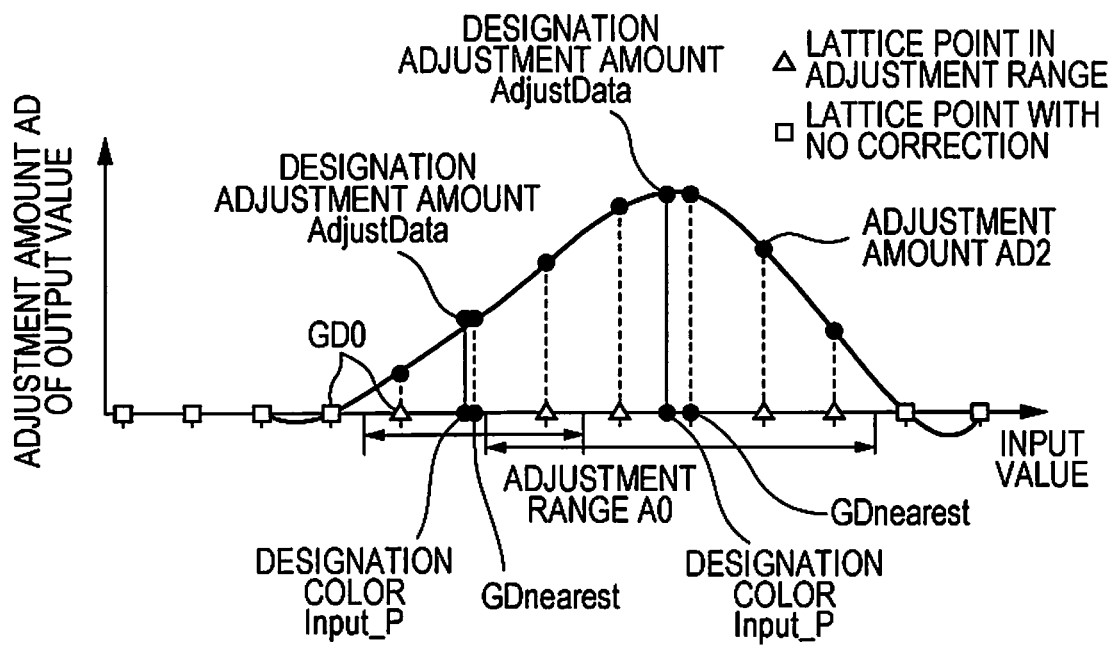
FIG. 22B is a diagram schematically illustrating an example in which adjustment amounts of output values at a lattice point in the vicinity of the nearest lattice point are determined.

After the host device 100 determines the adjustment amounts AD1 of the output values at the nearest lattice point GDnearest, as illustrated in FIG. 22B, the host device 100 determines adjustment amounts AD2 of the output values at a lattice point (a lattice point with the triangle) around the nearest lattice point GDnearest in the adjustment range A0 (S112 of FIG. 5). For example, by setting the adjustment amounts of the output values at the lattice point outside of the adjustment range A0 to 0, setting AdjustData as the adjustment amounts AD1 of the output values at each nearest lattice point GDnearest described above, and executing interpolation calculation by a 3-dimensional or 4-dimensional cubic spline function, it is possible to determine the adjustment amounts AD2 of the output values at a surrounding lattice point. Here, when the input color space CS4 is the CMYK color space, the interpolation calculation may be executed by a 4-dimensional cubic spline function. When the input color space CS4 is the Lab color space, the interpolation calculation may be executed by a 3-dimensional cubic spline function. By executing the interpolation calculation, the adjustment amounts AD2 of the output values at the surrounding lattice point is smoothly connected between the adjustment amounts AD1 of the output values at the nearest lattice point GDnearest and the adjustment amounts of "0" at the lattice point outside of the adjustment range A0.

Of course, the technology is not limited to the spline functions used for the interpolation calculation.

After the adjustment amounts AD of the output values at each lattice point of the adjustment range A0 is determined, the host device 100 reflects the determined adjustment amounts AD in the adjustment target profile 550 (S114 of FIG. 5). That is, values obtained by adding the adjustment amounts AD to the current output values at each lattice point of the adjustment range A0 may be written as the output values after updating in the adjustment target profile 550. For example, when the output color space CS5 of the adjustment target profile 550 is the cmyk color space, values (cq+Δcq, mq+Δmq, yq+Δyq, kq+Δkq) obtained by adding the adjustment amounts (Δcq, Δmq, Δyq, Δkq) to current output values (cq, mq, yq, kq) are the output values after the updating. When the output color space CS5 of the adjustment target profile 550 is the Lab color space, values (Lq+ΔLq, aq+Δaq, bq+Δbq) obtained by adding the adjustment amounts (ΔLq, Δaq, Δbq) to current output values (Lq, aq, bq) are the output values after the updating. Here, the variable q is a variable for identifying the lattice point in the adjustment range A0.

In this way, the correspondent relation of the adjustment target profile 550 is adjusted so that the current output values CurrentOut in the second color space CS2 are close to the target output values TargetOut. When there is the information appropriate for the designation intent in the adjustment target profile 550, the adjustment target profile 550 is adjusted in the correspondent relation appropriate for the designation intent.

After the adjustment target profile 550 is updated, the host device 100 obtains the current output values CurrentOut using the adjustment target profile 550 after the updating or the combination of the profiles including the adjustment target profile 550 after the updating at each adjustment point P0 input in the target acceptance region 840 (S116). The current output values CurrentOut after the updating can be calculated using the same expression as the process of S104 described with reference to FIGS. 14A to 14E and 15. When there is the information appropriate for the designation intent in the profile, the color conversion is executed according to the information appropriate for the designation intent.

The host device 100 obtains differences d between the current output values CurrentOut after the updating and the target output values TargetOut at each adjustment point P0 input in the target acceptance region 840 (S118). For example, the differences can be Euclid distances between points corresponding to the output values CurrentOut in the output color space CS5 of the adjustment target profile 550 and points corresponding to the target output values TargetOut.

In addition, the host device 100 determines whether an end condition of the repeated processes of S108 to S120 is established (S120). When the end condition is not established, the processes of S108 to S120 are repeated. When the end condition is established, the profile adjustment process ends. For example, when the differences d at all the adjustment points P0 are equal to or less than predetermined thresholds, the end condition can be established. When the repeated process reaches a specified number of times, the end condition may be established.

As described above, the adjustment target profile 550 is adjusted so that the current output values CurrentOut obtained from the input coordinate values corresponding to the adjustment point P0 according to the current adjustment target profile 550 or the combination of the profiles including the adjustment target profiles 550 are closed to the target output values TargetOut. In this way, since the adjustment target profile 550 is adjusted using the coordinate values indicating the output colors $cmyk_p$ as the reference, the profile used to convert the coordinate values of the color space can be adjusted with good color reproduction precision in the specific example. At this time, since the adjustment target profile 550 or the adjustment target color space CS6 can be designated, the specific example can flexibly correspond to a use environment of a user.

For example, when color conversion is executed, it is preferable to combine the input profile and the output profile for use in color conversion. On the other hand, when color reproduction precision of a single profile is desired to be improved as in spot color matching or the like, it is preferable to use the single profile for color conversion. In the specific example, since the combination of the profiles and the single profile for the color conversion can be switched, convenience can be achieved.

When the profiles are combined to adjust the profile, the adjustment target profile is desired to be set as the input profile in some cases and is desired to be set as the output profile in some cases. When a reason of color difference arise in the input profile, the input profile can be set as the adjustment target, and thus it is not necessary to separately adjust the output profile such as printer profile of another print substrate. When a reason of an error is considered to arrive in the output profile, the output profile can be adjusted, and thus it is not necessary to separately adjust another input profile.

Further, for example, the following procedure can be considered as a procedure in which the user adjusts the profile. Specific examples can correspond to all the procedures.

(Procedure 1) It is assumed that there is a color sample indicating a target color for a user who desires to visually match colors without using a colorimeter. There is a mixing color chart data indicating a mixing color chart in which surrounding colors of a color desired to be matched are disposed, the mixing color chart data is converted into an input profile and an output profile, and the mixing color chart is printed. The user selects a patch closest to a target color in the mixing color chart to obtain CMYK values that form the patch. The profiles are adjusted setting the CMYK values as a target in the CMYK color space.

(Procedure 2) It is assumed that there is a color sample indicating a target color for a user who desires to visually match colors without using a colorimeter. A mixing color chart in which output data ($cmyk_p$) and surrounding colors in a combination of a current profile with input data ($CMYK_{in}$) of the color desired to be matched are disposed is printed. The user selects a patch closest to a target color in the mixing color chart to obtain cmyk values that form the patch. The profiles are adjusted setting the cmyk values as a target in the cmyk color space.

As exemplified above, the specific examples can provide the technology for improving convenience of work for adjusting a profile to be used to convert the coordinate values of the color space.

(6) Modification Examples

Various modification examples of the invention can be considered.

For example, an output device is not limited to an ink jet printer, but may be an electrographic printer such as a laser printer, a 3-dimensional printer, a display device, or the like.

The kinds of color materials for forming an image are not limited to C, M, Y, and K, but may include Lc, Lm, dark yellow (Dy) with higher density than Y, orange (Or), green (Gr), light black (Lk) with lower density than K, unpigmented color materials for image quality improvement, or the like in addition to C, M, Y, and K.

Of course, the second color space is not limited to the cmyk color space, but may be the CMY color space, the RGB color space, or the like.

A target device is not limited to a target printer, but may be a display device or the like.

Of course, the first color space is not limited to the CMYK color space, but may be the CMY color space, the RGB color space, or the like.

The host device 100 may convert the color of the adjustment point P0 into the cmyk values according to the profile 500 including the adjustment target profile 550, cause the color measurement device 117 to measure colors of a patch by causing the ink jet printer 200 to print the color chart including the patch of the colors expressed with the cmyk values, and acquire measurement color values of the patch from the color measurement device 117. The measurement color values can be used to determine the adjustment target T0 input in the target acceptance region 840 illustrated in FIG. 7 or the like. The host device 100 may also determine the adjustment target T0 based on the color measurement values of the patch and displays the adjustment target T0 in the target acceptance region 840.

Further, the host device 100 may add the color measurement values from the color measurement device 117 when the adjustment target profile 550 is adjusted. When the processes of S108 to S120 in the profile adjustment process illustrated in FIG. 5 are repeated, the color measurement values may be added from the color measurement device 117 before the repeated processes of S108 to S120 are repeated, while the repeated processes of S108 to S120 may be executed, or after the repeated processes of S108 to S120 are executed.

The selection from the adjustment target profile designation field 820 illustrated in FIG. 9D is not limited to the selection from three kinds of the profiles 610, 620, and 630 and may be selection from two kinds of profiles. For example, even when the selection from the adjustment target profile designation field 820 is selection of two input profile 610 and output profile 620, selection of two input profile 610 and device link profile 630, or selection of two output profile 620 and device link profile 630, it is possible to obtain the basic operational effects and the advantages of Aspect 1 of the technology.

The color spaces which can be selected as the adjustment target color space are not limited to the three kinds of color spaces, the first color space, the second color space, and the profile connection space, but may be two kinds of color spaces, the first color space and the second color space, may be two kinds of color spaces, the first color space and the profile connection space, or may be two kinds of color spaces, the second color space and the profile connection space.

Even when the profiles are combined necessarily for the color conversion, it is possible to obtain the basic operational effects and the advantages of Aspect 1 included in the technology.

When one of the input color space and the output color space is accepted as the adjustment target color space to adjust the profiles despite no combination of the profiles for the color conversion, it is possible to obtain the basic operational effects and the advantages of Aspect 10 of the technology.

(7) Conclusion

As described above, according to the various aspects of the invention, it is possible to provide the technology or the like for improving convenience of work for adjusting a profile to be used to convert coordinate values of a color space. Of course, even in a technology realized by only constituent factors according to the independent claims, it is possible to obtain the above-described basic operational effects and advantages.

It is also embody configurations in which configurations disclosed in the above-described examples are substituted or combinations thereof are changed and configurations in which configurations disclosed in the known technologies and the above-described examples are substituted or combinations thereof are changed. The invention also includes such configurations.

This application claims priority under 35 U.S.C. § 119 to Japanese Patent Application No. 2017-111410, filed Jun. 6, 2017. The entire disclosure of Japanese Patent Application No. 2017-111410 is hereby incorporated herein by reference.

What is claimed is:

1. A profile adjustment method of causing a computer to adjust a profile to be used to convert first coordinate values of a first color space into second coordinate values of a second color space, the profile adjustment method comprising:

displaying a screen including at least
an input profile selection field through which an input profile defining a correspondent relation between the first coordinate values and third coordinate values of a profile connection space is configured to be selected,
an output profile selection field through which an output profile defining a correspondent relation between the third coordinate values and the second coordinate values is configured to be selected,
a link profile selection field through which a link profile defining a correspondent relation between the first coordinate values and the second coordinate values is configured to be selected, and
an adjustment target profile designation field through which an adjustment target profile is configured to be selected;
accepting a combination of profiles to be used to convert the first coordinate values into the second coordinate values, or accepting one profile to be used to convert the first coordinate values into the second coordinate values, through at least one or more of the input profile selection field, the output profile selection field, or the link profile selection field;
selectively accepting, as the adjustment target profile, one from the input profile, the output profile, and the link profile, or one from two profiles among the input profile, the output profile, and the link profile, through the adjustment target profile designation field;
accepting an adjustment target at coordinates at which an adjustment target color is expressed; and
adjusting the adjustment target profile based on the accepted adjustment target,
upon accepting, as the combination of the profiles, the input profile and the output profile in the input profile selection field and the output profile selection field, respectively, the selectively accepting of the one as the adjustment target profile being performed by simultaneously displaying a designation item of the input profile, a designation item of the output profile, and a designation item of the link profile in a field adjacent to the adjustment target profile designation field in response to selection of a list drop-down arrow adjacent to the adjustment target profile designation field, and accepting selection of one designation item from the designation items of the input profile, the output profile, and the link profile that are being displayed simultaneously.

2. The profile adjustment method according to claim 1, wherein the one profile which is the adjustment target profile to be used to convert the first coordinate values into the second coordinate values includes at least one of the input profile in which the second coordinate values are coordinate values of a profile connection space and the output profile in which the first coordinate values are the coordinate values of the profile connection space.

3. The profile adjustment method according to claim 1, further comprising:
   accepting one of two or more kinds of color spaces as the adjustment target color space among the first color space, the second color space, and the profile connection space,
   wherein in the accepting of the adjustment target profile, the adjustment target at the coordinates at which the adjustment target color is expressed in the adjustment target color space is accepted.

4. The profile adjustment method according to claim 1, further comprising:
   accepting an adjustment range adjusted based on the adjustment target of the adjustment target profile in the first color space,
   wherein in the adjusting of the adjustment target profile, the adjustment range of the adjustment target profile is adjusted based on the adjustment target.

5. The profile adjustment method according to claim 1, wherein in the adjusting of the adjustment target profile, when the adjustment target is not expressed with the second coordinate values, the second coordinate values corresponding to the adjustment target are obtained as target output values, and the adjustment target profile is adjusted so that the second coordinate values obtained according to the input profile and the output profile or the link profile from the first coordinate values corresponding to coordinates at which the adjustment target color is expressed approach the target output values.

6. The profile adjustment method according to claim 1, wherein in the adjusting of the adjustment target profile, when the input profile is accepted as the adjustment target profile, adjustment target values expressed with the third coordinate values are obtained from the adjustment target expressed with the second coordinate values, and the adjustment target profile is adjusted using the adjustment target values and coordinates at which the adjustment target color expressed with the first coordinate values is expressed.

7. The profile adjustment method according to claim 1, wherein in the adjusting of the adjustment target profile, when the output profile is accepted as the adjustment target profile, input values expressed with the third coordinate values are obtained from coordinates at which the adjustment target color is expressed with the first coordinate values, and the adjustment target profile is adjusted using the input values and the adjustment target expressed with the second coordinate values.

8. The profile adjustment method according to claim 1, further comprising:
   accepting one of a plurality of rendering intents for defining a correspondent relation of the adjustment target profile as a designation intent,
   wherein in the adjusting of the adjustment target profile, the adjustment target profile is adjusted in a correspondent relation in accordance with the designation intent.

9. The profile adjustment method according to claim 8, wherein in the adjusting of the adjustment target profile, when the adjustment target is not expressed with the output coordinate values, the output coordinate values corresponding to the adjustment target are obtained as target output values, and the profile is adjusted so that the output coordinate values obtained according to the current profile from the input coordinate values corresponding to coordinates at which the adjustment target color is expressed approach the target output values.

10. The profile adjustment method according to claim 1, wherein in the accepting of the adjustment target, selection of one of an option (A) in which the adjustment target is accepted as coordinate values of a color space and an option (B) in which the adjustment target is accepted as differences from current coordinate values of the color space is accepted, the adjustment target is accepted as the coordinate values of the color space when the option (A) is selected, the adjustment target is accepted as differences from the current coordinate values of the color space when the option (B) is selected.

11. The profile adjustment method according to claim 2, further comprising:
    accepting one of two or more kinds of color spaces as the adjustment target color space among the first color space, the second color space, and the profile connection space,
    wherein in the accepting of the adjustment target profile, the adjustment target at the coordinates at which the adjustment target color is expressed in the adjustment target color space is accepted.

12. The profile adjustment method according to claim 2, further comprising:
    accepting an adjustment range adjusted based on the adjustment target of the adjustment target profile in the first color space,
    wherein in the adjusting of the adjustment target profile, the adjustment range of the adjustment target profile is adjusted based on the adjustment target.

13. The profile adjustment method according to claim 3, further comprising:
    accepting an adjustment range adjusted based on the adjustment target of the adjustment target profile in the first color space,
    wherein in the adjusting of the adjustment target profile, the adjustment range of the adjustment target profile is adjusted based on the adjustment target.

14. The profile adjustment method according to claim 2, wherein in the adjusting of the adjustment target profile, when the adjustment target is not expressed with the second coordinate values, the second coordinate values corresponding to the adjustment target are obtained as target output values, and the adjustment target profile is adjusted so that the second coordinate values obtained according to the input profile and the output profile or the link profile from the first coordinate values corresponding to coordinates at which the adjustment target color is expressed approach the target output values.

15. A profile adjustment method of causing a computer to adjust a profile defining a correspondent relation between input coordinate values of an input color space and output coordinate values of an output color space, the profile adjustment method comprising:

displaying a screen including at least
- an input profile selection field through which an input profile defining a correspondent relation between the input coordinate values and coordinate values of a profile connection space is configured to be selected,
- an output profile selection field through which an output profile defining a correspondent relation between the coordinate values of the profile connection space and the output coordinate values is configured to be selected,
- a link profile selection field through which a link profile defining a correspondent relation between the input coordinate values and the output coordinate values is configured to be selected,
- an adjustment target profile designation field through which an adjustment target profile is configured to be selected, and
- an adjustment target color space selection field through which an adjustment target color space is configured to be selected;

accepting a combination of profiles to be used to convert the input coordinate values into the output coordinate values, or accepting one profile to be used to convert the input coordinate values into the output coordinate values, through at least one or more of the input profile selection field, the output profile selection field, or the link profile selection field;

selectively accepting, as the adjustment target profile, one from the input profile, the output profile, and the link profile, or one from two profiles among the input profile, the output profile, and the link profile, through the adjustment target profile designation field;

selectively accepting, as the adjustment target color space, one color space from two or more kinds of color spaces among the input color space, the output color space, and the profile connection space when the input color space and the output color space are not the profile connection space;

accepting an adjustment target at coordinates at which an adjustment target color is expressed in the adjustment target color space; and adjusting the adjustment target profile based on the accepted adjustment target, upon accepting, as the combination of the profiles, the input profile and the output profile in the input profile selection field and the output profile selection field, respectively, the selectively accepting of the one color space being performed by simultaneously displaying a selection item of the input color space, a selection item of the output color space, and a selection item of the profile connection space in a field adjacent to the adjustment target color space selection field in response to selection of a list drop-down arrow adjacent to the adjustment target color space selection field, and accepting selection of one selection item from the selection items of the input color space, the output color space, and the profile connection space that are being displayed simultaneously.

16. A profile adjustment device that adjusts a profile to be used to convert first coordinate values of a first color space into second coordinate values of a second color space, the profile adjustment device comprising:
- a display that displays a screen including at least
  - an input profile selection field through which an input profile defining a correspondent relation between the first coordinate values and third coordinate values of a profile connection space is configured to be selected,
  - an output profile selection field through which an output profile defining a correspondent relation between the third coordinate values and the second coordinate values is configured to be selected,
  - a link profile selection field through which a link profile defining a correspondent relation between the first coordinate values and the second coordinate values is configured to be selected, and
  - an adjustment target profile designation field through which an adjustment target profile is configured to be selected;
- a profile selection unit that accepts a combination of profiles to be used to convert the first coordinate values into the second coordinate values, or accepts one profile to be used to convert the first coordinate values into the second coordinate values, through at least one or more of the input profile selection field, the output profile selection field, or the link profile selection field;
- an adjustment target profile designation unit that selectively accepts, as the adjustment target profile, one from the input profile, the output profile, and the link profile, or one from two profiles among the input profile, the output profile, and the link profile, through the adjustment target profile designation field;
- a target acceptance unit that accepts an adjustment target at coordinates indicating an adjustment target color; and
- a profile adjustment unit that adjusts the adjustment target profile based on the accepted adjustment target,
- in response to the profile selection unit accepting, as the combination of the profiles, the input profile and the output profile in the input profile selection field and the output profile selection field, respectively, the display simultaneously displaying a designation item of the input profile, a designation item of the output profile, and a designation item of the link profile in a field adjacent to the adjustment target profile designation field in response to selection of a list drop-down arrow adjacent to the adjustment target profile designation field, and the adjustment target profile designation unit accepting selection of one designation item from the designation items of the input profile, the output profile, and the link profile that are being displayed simultaneously.

* * * * *